US011392395B2

(12) United States Patent
Li

(10) Patent No.: US 11,392,395 B2
(45) Date of Patent: Jul. 19, 2022

(54) GENERATING AND PRESENTING CONTEXTUAL USER INTERFACES ON DEVICES WITH FOLDABLE DISPLAYS

(71) Applicant: Citrix Systems, Inc., Fort Lauderdale, FL (US)

(72) Inventor: Xin Li, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/743,060

(22) Filed: Jan. 15, 2020

(65) Prior Publication Data

US 2021/0216332 A1 Jul. 15, 2021

(51) Int. Cl.
*G06F 9/451* (2018.01)
*G06F 1/16* (2006.01)
*G06F 3/04883* (2022.01)
*G06F 3/0482* (2013.01)

(52) U.S. Cl.
CPC ............ *G06F 9/451* (2018.02); *G06F 1/1641* (2013.01); *G06F 3/0482* (2013.01); *G06F 3/04883* (2013.01)

(58) Field of Classification Search
CPC .... G06F 9/451; G06F 3/0482; G06F 3/04883; G06F 1/1641
See application file for complete search history.

(56) References Cited

U.S. PATENT DOCUMENTS

| 10,551,995 | B1* | 2/2020 | Ho | G06F 3/0486 |
| 2010/0302179 | A1* | 12/2010 | Ahn | H04M 1/72583 |
| | | | | 345/173 |
| 2013/0227413 | A1* | 8/2013 | Thorsander | G06F 3/04886 |
| | | | | 715/716 |
| 2014/0101535 | A1* | 4/2014 | Kim | G06F 3/1431 |
| | | | | 715/234 |

(Continued)

FOREIGN PATENT DOCUMENTS

| KR | 20150060278 A | 6/2015 |
| KR | 20160091072 A | 8/2016 |
| KR | 101801359 B1 | 11/2017 |

OTHER PUBLICATIONS

Apr. 15, 2019, "Hands-On With the Samsung Galaxy Fold: More than Just a Concept", Dieter Bohn, 14 pages.
Apr. 29, 2021, International Search Report of PCT/US2021/013213.

*Primary Examiner* — Tan H Tran
(74) *Attorney, Agent, or Firm* — Banner & Witcoff, Ltd.

(57) ABSTRACT

Methods and systems for generating and presenting one or more user interfaces on devices with foldable displays are described herein. An application, executing on the device, displays a first user interface on a first portion of a foldable display. The first user interface includes an indication of tasks for a plurality of applications hosted on a remote server. The application displays a second user interface on the first portion and a second portion of the foldable display when the device unfolded. The second user interface includes the tasks indicated by the first user interface. In response to receiving an input to initiate execution of at least (Continued)

one task, the application provides data to an application hosted by the remote server and associated with the at least one task. By adapting to the different displays provided by the foldable device, the application improves users' experiences with applications executing on the device.

20 Claims, 20 Drawing Sheets

(56) References Cited

U.S. PATENT DOCUMENTS

| | | |
|---|---|---|
| 2014/0152606 A1 | 6/2014 | Kunitake et al. |
| 2014/0164913 A1* | 6/2014 | Jaros .................. G06F 16/9577 |
| | | 715/243 |
| 2015/0338888 A1 | 11/2015 | Kim et al. |
| 2016/0026367 A1* | 1/2016 | Brown .............. H04M 1/72552 |
| | | 715/835 |
| 2016/0180279 A1* | 6/2016 | Koerner ................. G06Q 50/01 |
| | | 705/7.15 |
| 2017/0090690 A1* | 3/2017 | Chor ........................ G06F 9/451 |
| 2018/0329508 A1* | 11/2018 | Klein ..................... G06F 1/1615 |
| 2019/0087202 A1* | 3/2019 | Reddy Koki ......... G06F 3/0486 |
| 2020/0027425 A1* | 1/2020 | Lee ........................ G06F 1/1652 |
| 2020/0177705 A1* | 6/2020 | Rossman ............ H04L 65/4069 |
| 2020/0264826 A1* | 8/2020 | Kwon .................. G06F 3/0416 |
| 2020/0278720 A1* | 9/2020 | Kim ...................... G06F 1/1677 |
| 2020/0310492 A1* | 10/2020 | Kim ...................... G06F 1/1652 |

* cited by examiner

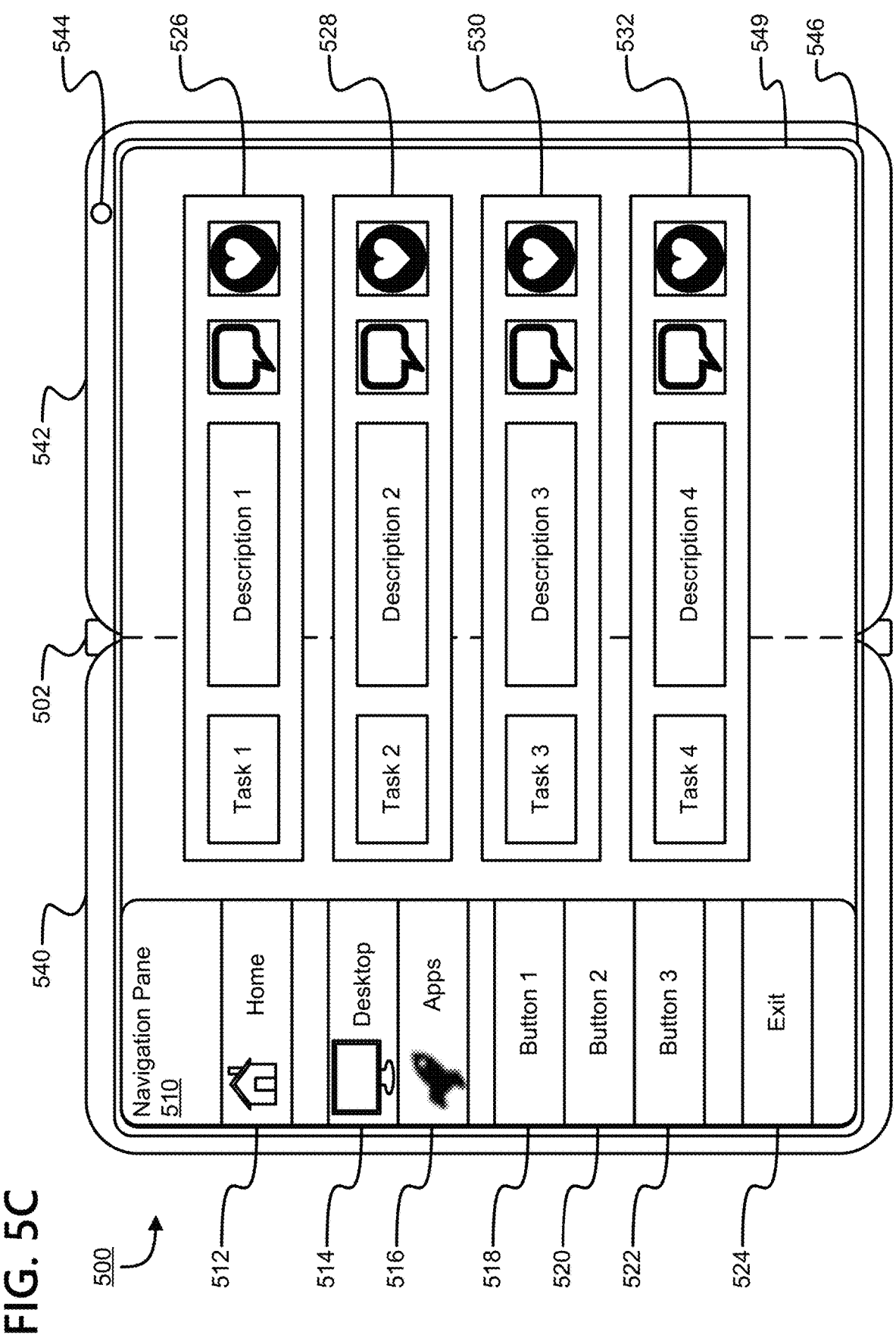

GENERATING AND PRESENTING CONTEXTUAL USER INTERFACES ON DEVICES WITH FOLDABLE DISPLAYS

FIELD

Aspects described herein generally relate to displays for computing devices and computer hardware and software related thereto. More specifically, one or more aspects described herein provide techniques foldable displays for computing systems.

BACKGROUND

Traditionally, mobile applications are tailored to specific platforms (e.g., smart phone, mobile device, tablet computing device, etc.) and/or operating systems (e.g., iOS®, Android®, etc.). In this regard, a mobile application may have a version that is designed to run on a mobile device and a counterpart version that is designed to run on a tablet computing device. These separate application versions provide better user interfaces for their respective devices, and thus may provide better overall user experiences when used on such devices.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Since a foldable device includes both the display of a mobile device and the display of a tablet computing device, the user interfaces of both the mobile application and the tablet computing device application are not optimized for the different displays of the foldable device. Further, the user interface of the mobile application might not be capable of being displayed on a tablet computing device, and vice versa. Thus, an application that is unable to provide an optimized user interface for each of the different displays on a foldable device results in a negative user experience and diminished use of the application. To overcome limitations with applications not optimized for different displays of a foldable device in the prior art described above, and to overcome other limitations that will be apparent upon reading and understanding the present specification, aspects described herein are directed towards an adaptable user interface to display a first user interface of an application when a foldable display is closed (e.g., folded) and a second interface of the application when the foldable display is opened (e.g., unfolded).

Examples of methods and apparatuses disclosed herein describe displaying, by a computing device, a first user interface on a first portion of a foldable display. The first user interface may comprise an indication of tasks for a plurality of applications hosted on a remote server. The tasks for the plurality of applications may be disabled in the first user interface. The first user interface may also include a navigation menu presented concurrently with the indication of tasks for the plurality of applications. A second user interface may be displayed, by the computing device, on the first portion and a second portion of the foldable display in response to a change in position of at least one of the first and second portions of the foldable display. The second user interface may comprise the tasks for the plurality of applications as indicated by the first user interface. The tasks for the plurality of applications may be enabled in the second user interface. The first and second user interfaces may be associated with an enterprise productivity application associated with an enterprise productivity support server. The computing device may provide data to an application hosted by the remote server, and associated with at least one of the tasks displayed within the second user interface, to initiate execution of the at least one task in response to receipt of an input on the foldable display. The input may be an approval of the at least one task.

In some instance, initiating execution of the at least one task may include launching a first application associated with the at least one task. The first application may be displayed on both the first portion and the second portion of the foldable display. If the first application is displayed on both the first portion and the second portion of the foldable display, the computing device may receive a gesture input, such as a three-finger fan in, from a user of the computing device. causing, based on the received gesture input, the first application may be displayed on the first portion of the foldable display in response to the received gesture input. Additional information, such as the indication of tasks for the plurality of applications, a second application, and/or a desktop, may be displayed on the second portion of the foldable display.

A second application associated with the at least one task may also be launched, for example, in response to initiating execution of the at least one task. In these instances, the first application and the second application may be displayed on the both the first portion and the second portion of the foldable display simultaneously. The computing device may receive a gesture input, such as a three-finger fan out. The computing device may display the first application on both the first portion and the second portion of the foldable display, for example, in response to the gesture input.

The computing device may transmit a request for updated tasks for the plurality of applications hosted on the remote server. The request may be transmitted to an enterprise productivity support server and in response to a second change in position of at least one of the first and second portions the foldable display. The computing device may receive a response that includes the updated tasks for the plurality of applications. The computing device may then display the first user interface on the first portion of the foldable display that includes an updated indication of tasks for the plurality of applications. The indication of tasks may be user-specific and generated by an enterprise productivity support server based on a user's role and input received from other users.

Additionally, aspects of the disclosure describe a computing device causing a first user interface to be presented on a first display. The first user interface may comprise a plurality of contextual tasks including a first task associated with a user. The computing device may detect an opening of a foldable display and cause a second user interface to be displayed on the foldable display in response to detecting the opening of the foldable display. The computing device may receive one or more inputs related to the first task via the second user interface. At some point detecting the opening of the foldable display, the computing device may detect a closing of the foldable display. The computing device may generate an updated list of contextual tasks based on one or more actions performed in the second user interface and based on updated task information received from an enterprise productivity support server. The computing device may cause an updated first user interface to be displayed on the first display. The updated first user interface may comprise the updated list of contextual tasks. The first user interface and the second user interface may be associated with an enterprise productivity application associated with the enterprise productivity support server.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 5A-5C depict an illustrative example of updating a user interface in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards an application that adapts a user interface based on whether a foldable display is folded or unfolded. The application may be configured to display a first user interface on a first display when the foldable display is closed (e.g., folded). The application may be configured to display a second user interface on a foldable display when the foldable display is opened (e.g., unfolded). By adapting to the different display configurations, the adaptable user interface improves users' experiences with applications executing on the foldable displays.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," and similar terms, is meant to include both direct and indirect mounting, connecting, and coupling.

Computing Architecture

Figure 1:
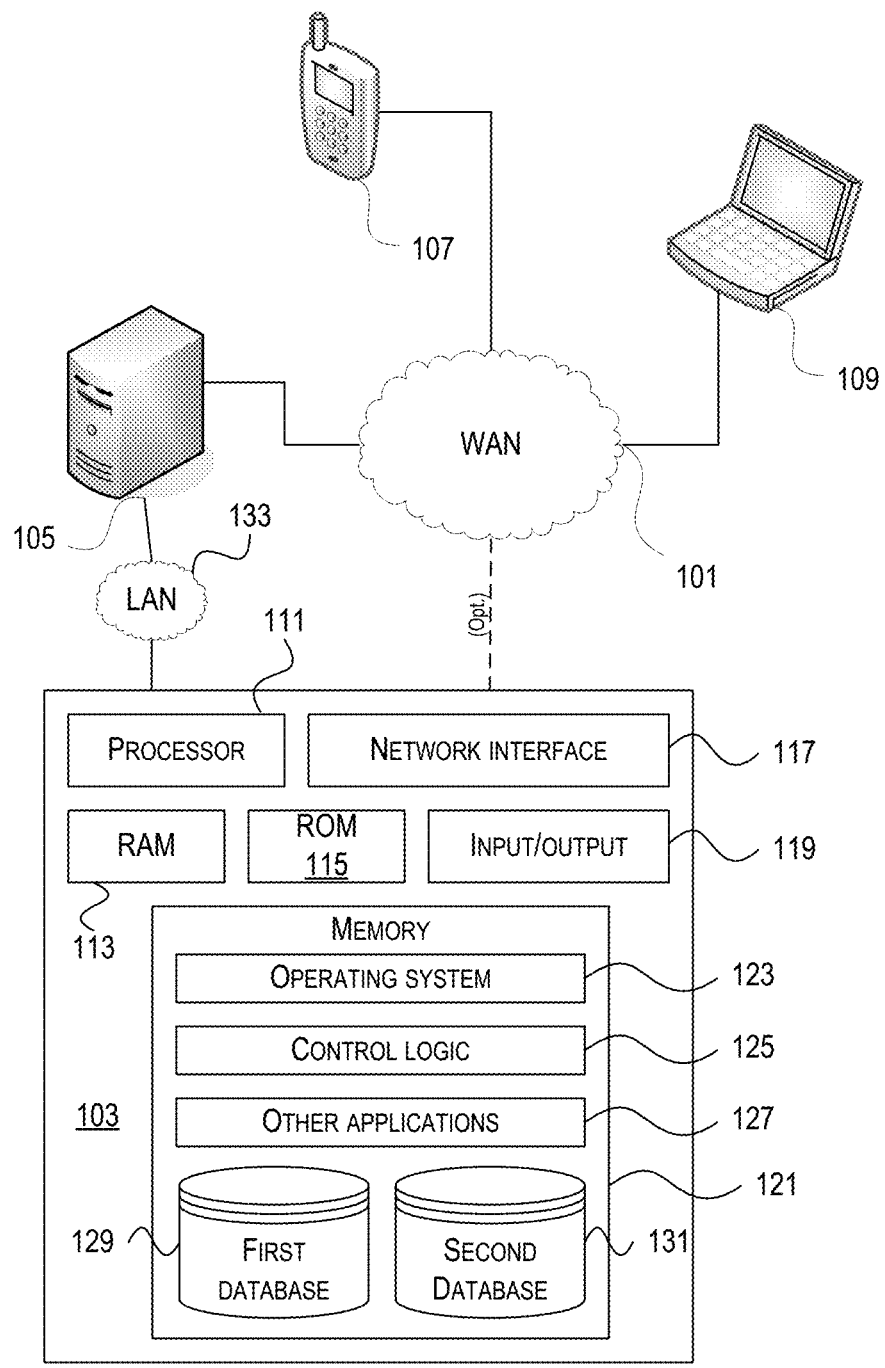
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
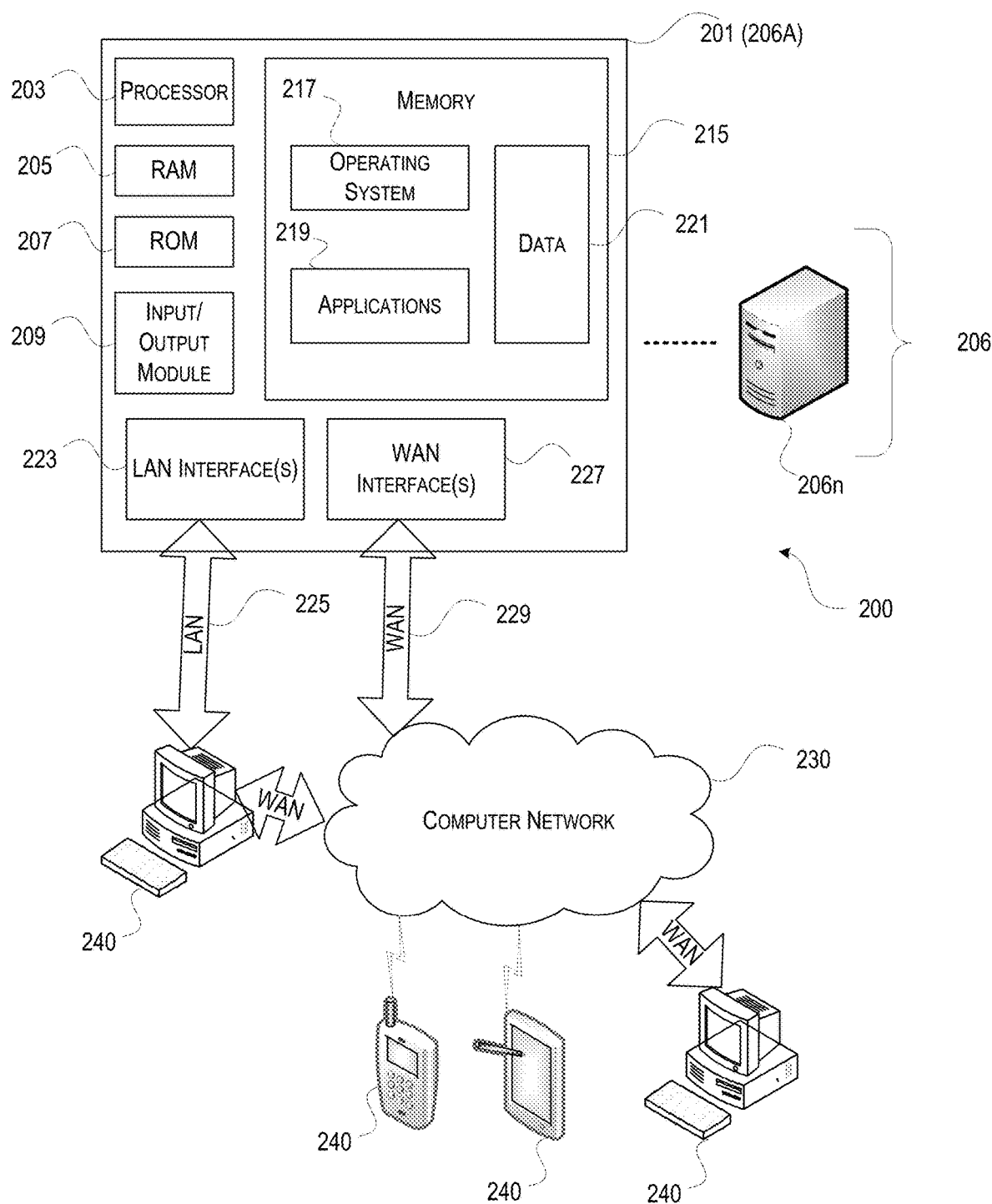
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206*a* in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
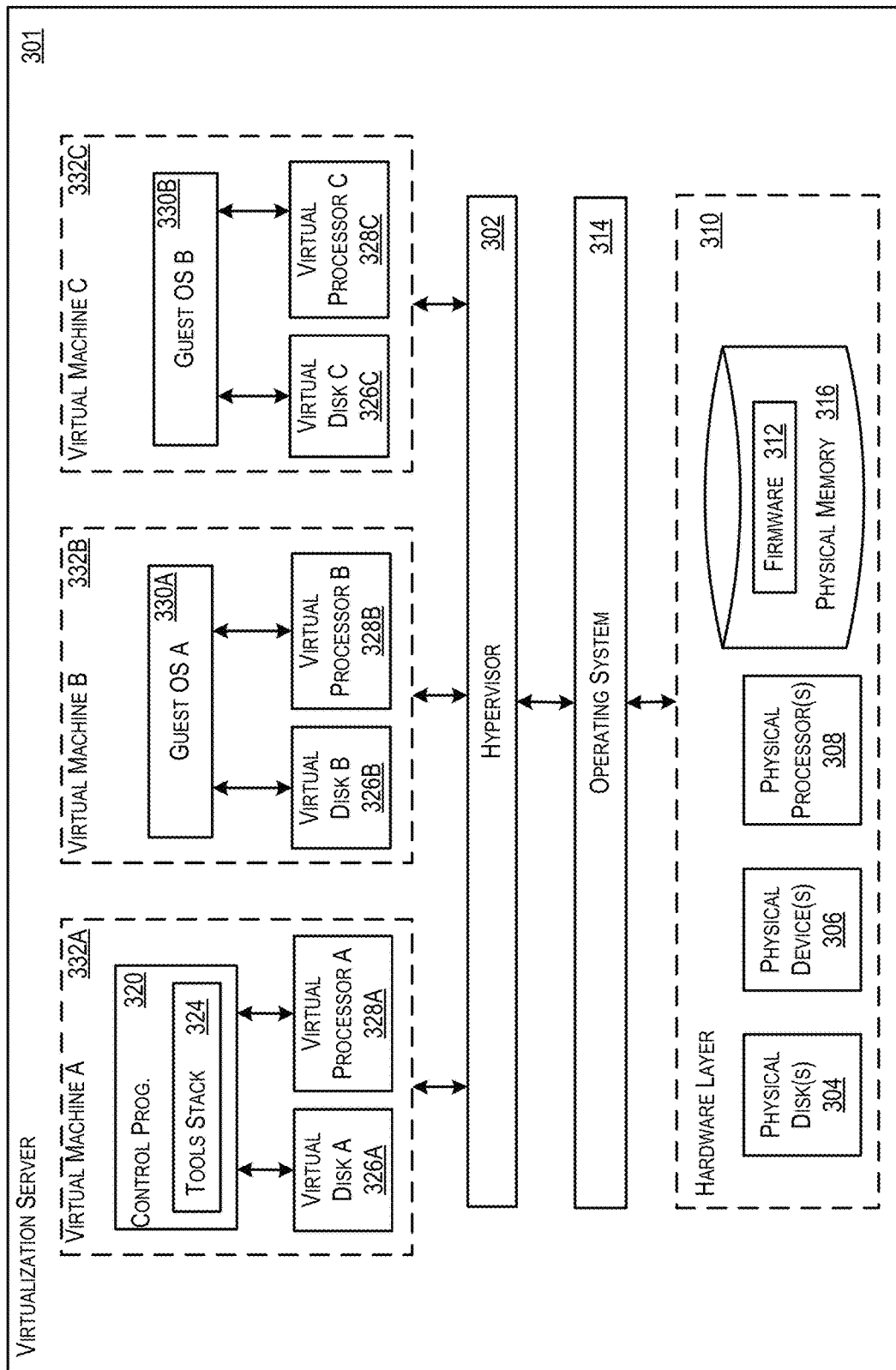
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
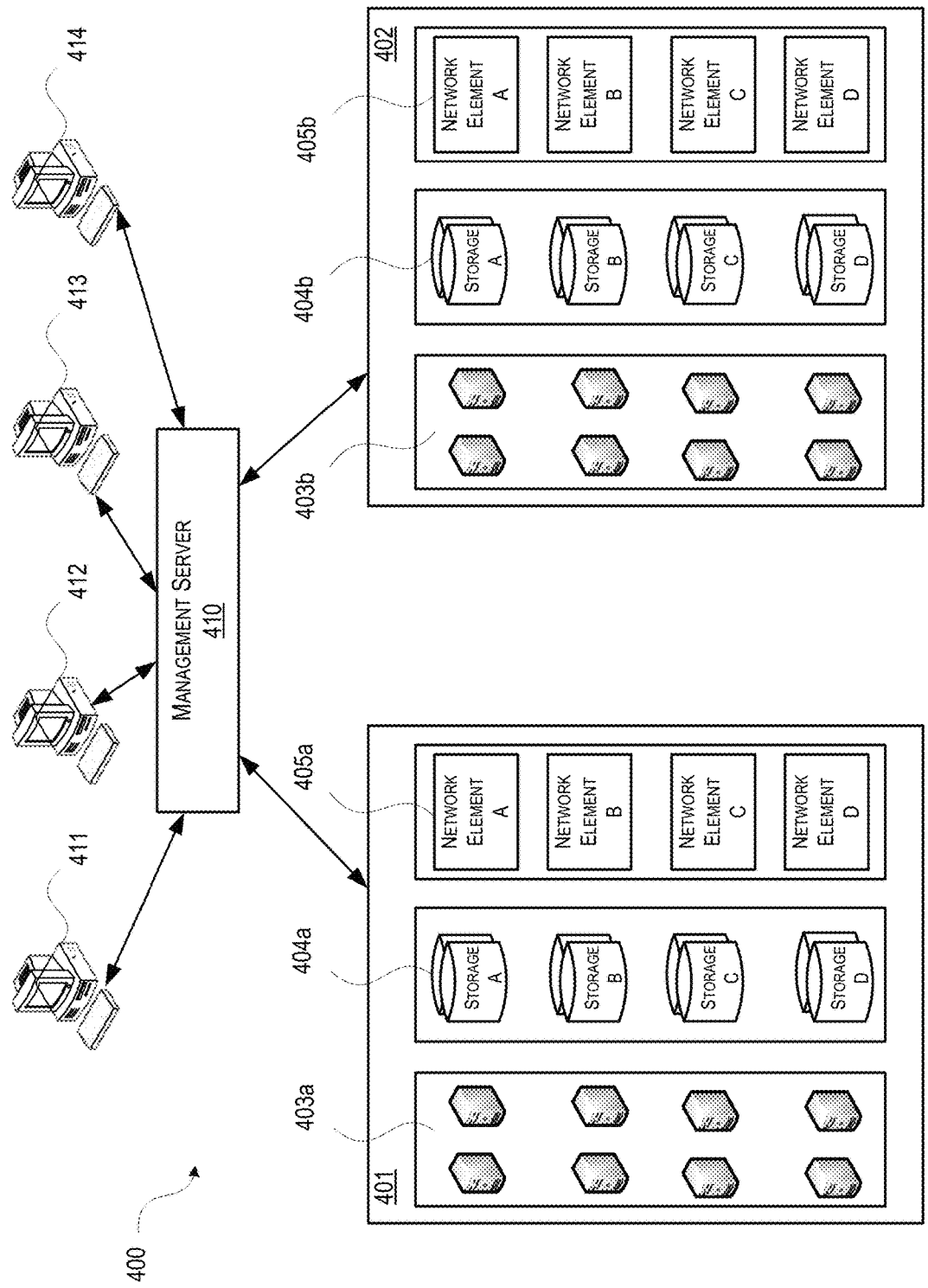
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

User Interface for Foldable Devices

Application ("app") developers typically produce apps with user interfaces that are optimized based on platform (e.g., smart phone, mobile device, tablet computing device, etc.) and/or operating system (e.g., iOS®, Android®). For example, an application may be developed and released to have a version optimized to run on a mobile device and a counterpart version optimized to run on a tablet computing device. A mobile application executing on a tablet computing device, or vice versa, may perform poorly. For example, executing a mobile application on a tablet computing device may cause the user interface of the mobile application to be distorted. In this regard, buttons and/or features of the user interface of the mobile application might not be displayed or, if displayed, the buttons and/or features might not be shown clearly and/or function properly. Similarly, executing a tablet application on a mobile device may result in poor performance of the user interface of the tablet application. For instance, the resolution of the tablet application may be reduced such that the entire user interface might not be displayed. If the user interface of the tablet application is displayed on the mobile device, the user interface may be illegible. Further, certain buttons might not be displayed (e.g., for being outside the resolution of the mobile device). Thus, separate application versions provide better user interfaces for their respective devices, which results in a better overall user experience with the application.

Foldable devices, such as the Samsung Galaxy Fold® and the Motorola Razr®, typically provide two displays: a first display similar to that found on a mobile device and a second display similar to a display of a tablet computing device. Since applications are optimized for specific platforms, user-interfaces of existing applications are ill-suited to accommodate foldable displays. That is, existing user interfaces are better suited for either a mobile display (e.g., the folded display) or a tablet display (e.g., the unfolded display), but not both. Accordingly, there is a need for applications that are capable of adapting their user interfaces based on whether the mobile device is currently folded (e.g., presenting a user interface on a smaller display) or unfolded (e.g., presenting a user interface on a larger display). The processes, techniques, methods, and systems describe herein disclose techniques by which an application may adapt its user interface based on whether a foldable mobile device is folded or unfolded to provide an improved user experience.

The present disclosure describes processes, techniques, methods, and systems by which an application may adapt its user interface in response to determining whether a foldable display is folded or unfolded. In this regard, an application, such as an enterprise productivity application like Citrix Workspace™, may determine whether a foldable display is folded (e.g., closed) or unfolded (e.g., open), for example, in response to a user launching the application. The enterprise productivity application may communicate with and receive data and information from a counterpart enterprise productivity support server to empower a mobile workforce. In this regard, the enterprise productivity support server may transmit a plurality of contextual tasks to the enterprise productivity application, which may display the tasks for the user. Additionally or alternatively, the enterprise productivity server may host one or more virtual applications that a user may access via the enterprise productivity application on their mobile device. When the enterprise productivity application determines that the foldable display is closed, the enterprise productivity application may cause a first user interface to be displayed to the user. The first user interface may be configured to be presented on a first display (e.g., screen, monitor) similar to those found on a mobile device. While working in the app, the user may open the foldable display. The enterprise productivity application may then change (e.g., modify, alter) the first user interface to a second user interface configured to be presented on a second display (e.g., screen, monitor) similar to those found on a tablet computing device.

Figure 5A:
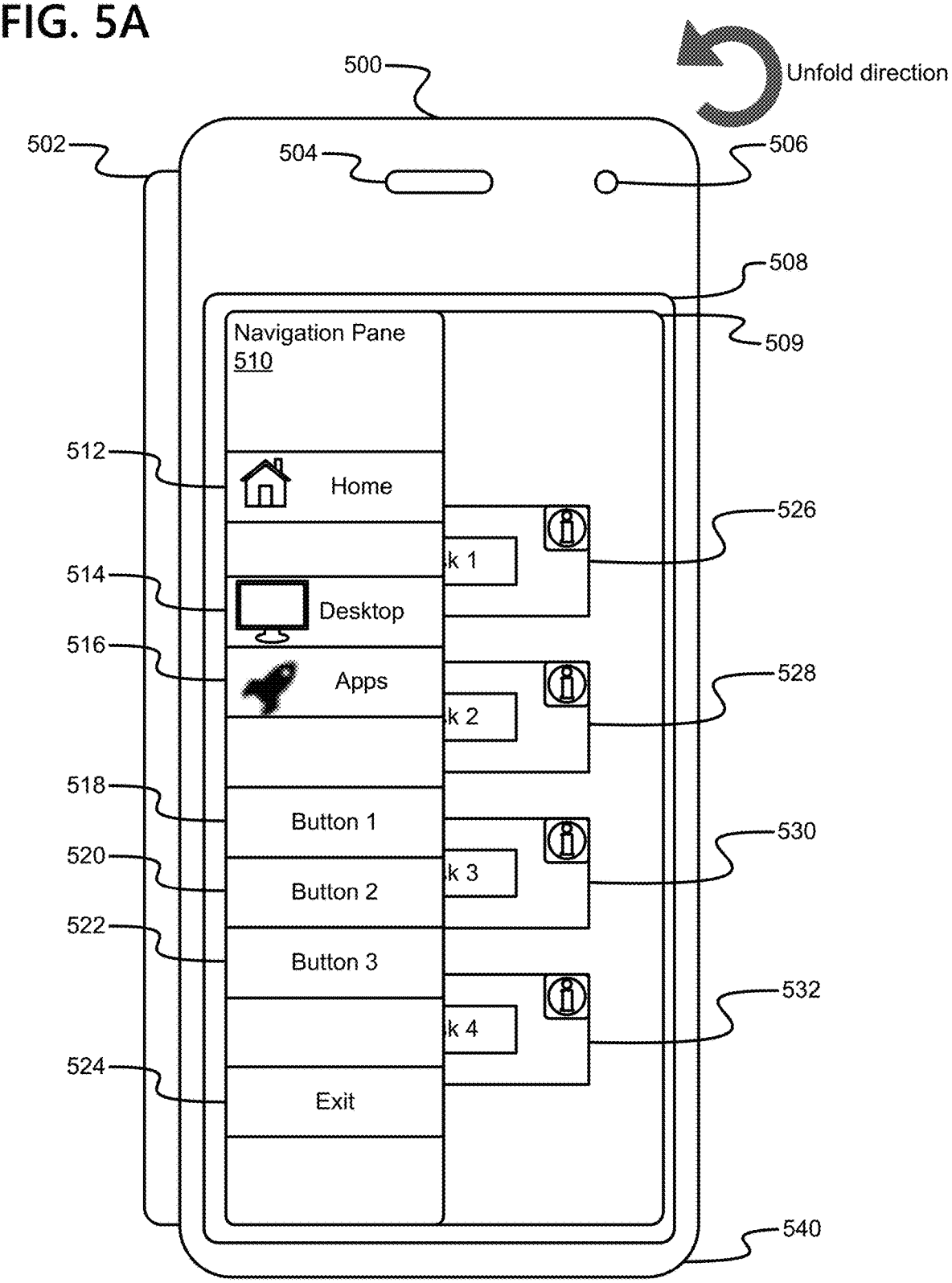
Figure 5B:
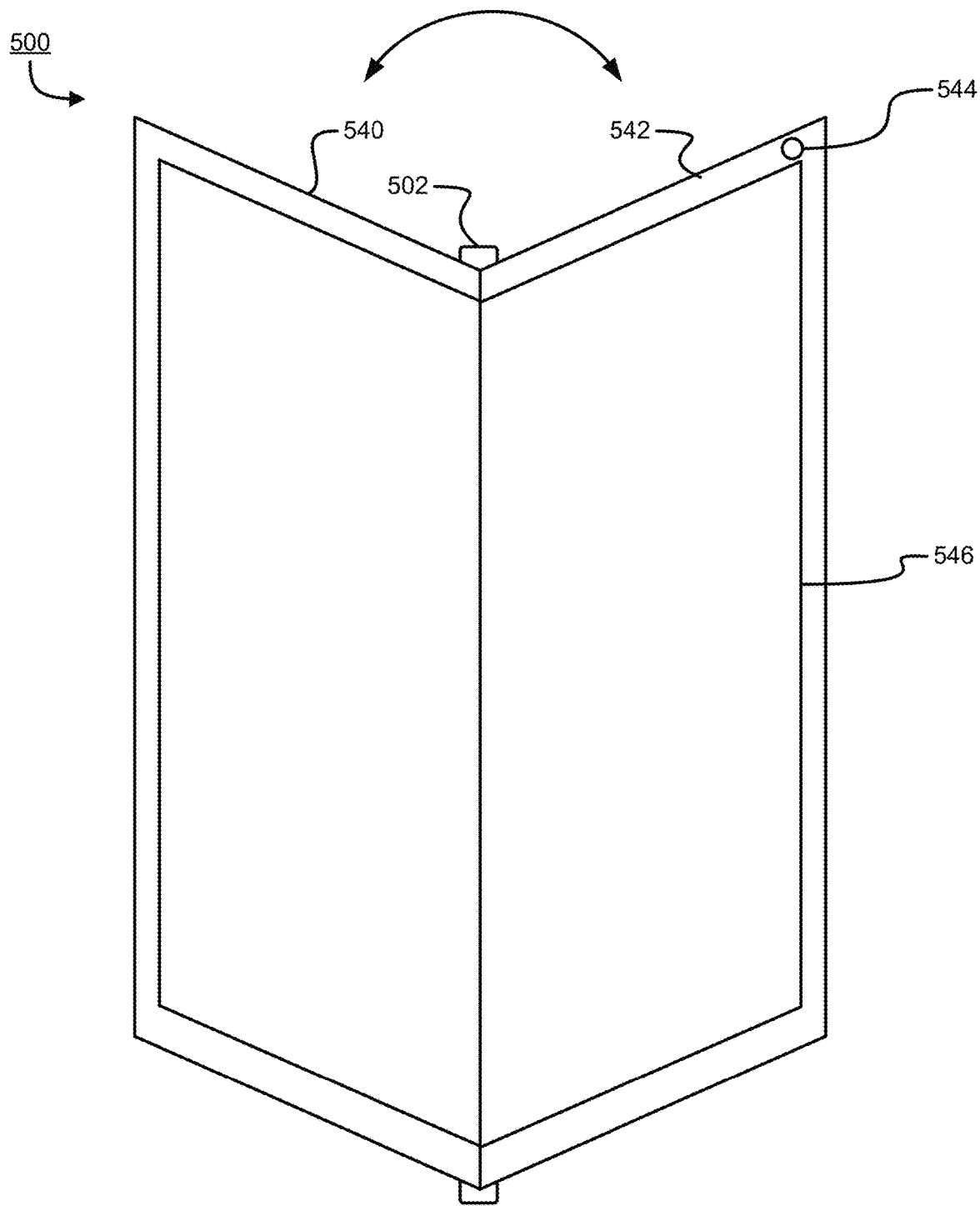

FIGS. 5A-5C show an example of a device (e.g., an enterprise productivity application executing on the device) transitioning from a first user interface on a first display to a second user interface on a foldable display, for example, in response to detecting the opening of the foldable display. FIG. 5A shows a mobile device 500 that includes a foldable display (which itself is not shown in FIG. 5A, as the foldable display is enclosed within the chassis of mobile device 500 while the device is folded). Mobile device 500 may include a housing, indicated by first portion 540 and a second portion (which is not shown in FIG. 5A because the second portion is behind first portion 540) interconnected or otherwise coupled together via hinge 502. Mobile device 500 may also include a speaker 504, an image capture device 506, and a first display 508. Speaker 504 may be any suitable speaker configured to provide audio, such as a phone conversation, music, and/or an audio stream from a video. Image capture device 506 may be any suitable camera and/or video recorder capable of capturing and/or recording images and/or video. First display 508 may be an exterior (e.g., outwardly) facing display that is smaller than a foldable display of the mobile device. Alternatively, the first display 508 may be a portion (e.g., half) of a foldable display. For instance, in additional or alternative arrangements, the foldable display might not be enclosed within the chassis of mobile device 500 while the device 500 is folded; rather, the other portion (e.g., half) of the foldable display may also be an exterior (e.g., outwardly) facing display that is aligned with, but facing the opposite direction from, the first display 508 while the device 500 is folded. In such arrangements, the other portion (e.g., half) of the foldable display may be disposed along the rear (e.g., back) side of mobile device 500 while the device is folded.

In response to determining that the foldable display is closed, mobile device 500 may cause a first user interface of an application to be presented on the first display 508. The application may be an enterprise productivity application, such as Citrix Workspace™, that allows users to securely access a plurality of cloud-based tasks and/or applications, such as those discussed with respect to FIGS. 3 and 4. The enterprise productivity application may be a virtual machine receiver program or an application to display an output of an application window, a browser, or other output window, as described above with respect to FIG. 2. Additionally or alternatively, the enterprise productivity application may allow the mobile device 500 to execute a desktop comprising a graphical shell that provides a user interface for an instance of an operating system in which local and/or remote applications may be integrated as described with respect to FIG. 2 above.

As part of the enterprise productivity application, the first user interface 509 may include a navigation pane 510 and a plurality of tasks (e.g., first task 526, second task 528, third task 530, and fourth task 532). Navigation pane 510 may include home button 512, a desktop button 514, an apps button 516, a first button 518, a second button 520, a third button 522, and an exit button 524. When selected, home button 512 may cause a home user interface to be displayed with the first display 508. The "Home" user interface may include the navigation pane 510 and the plurality of tasks. Additionally or alternatively, the "Home" user interface may be configured by the user. Accordingly, the "Home" user interface may display data and information that the user may consider to be important and/or higher priority.

Desktop button 514 may cause a desktop and/or a virtual desktop application to be launched. As discussed above with respect to FIG. 2, the desktop application may comprise a graphical shell that provides a user interface for an instance of an operating system in which local and/or remote applications can be integrated. Apps button 516 may cause a sub-menu to be displayed that includes one or more virtual applications that are available to the user, such as those discussed above with respect to FIG. 3. First button 518, second button 520, and/or third button 522 may be hot buttons configured by the user. For example, first button 518, second button 520, and/or third button 522 may be configured to launch one or more apps. Additionally or alternatively, first button 518, second button 520, and/or third button 522 may be configured to launch one or more applications associated with different tasks. First button 518, second button 520, and/or third button 522 may be pinned (or unpinned) by the user. In some instances, the enterprise productivity application may automatically include first button 518, second button 520, and/or third button 522 based on applications, desktops, and/or tasks that the user frequently accesses. Exit button 524 may be configured to exit (e.g., quit) the application. Additionally or alternatively, exit button 524 may be configured to log the user out of the application. It will be appreciated that the above-identified buttons are merely illustrative and that greater, or fewer, buttons may be included in navigation pane 510.

The plurality of tasks may be layered or partially hidden under navigation pane 510 in order to maximize the usable space of the first display 508 while alerting users of upcoming and/or assigned tasks. The plurality of tasks may be generated by the application (e.g., the enterprise productivity application) and associated with projects, meetings, and/or other assignments the user may be performing. The plurality of tasks may link to one or more applications and/or virtual applications executing on a server, such as server 206 described above. First task 526, second task 528, third task 530, and/or fourth task 532 may include a title of the task and an information button. The information button of each tasks may provide additional information about the task associated with the selected button. The plurality of tasks in the first user interface 509 might not be interactive. In other words, the plurality of tasks may be displayed for the user to convey the number of tasks, the importance of individual tasks, etc. It will be appreciated that the above-identified tasks and the examples described above are merely illustrative and that greater, or fewer, tasks may be displayed in the first user interface 509.

FIG. 5B illustrates an example of mobile device 500 unfolding. In this regard, mobile device 500 comprises a housing that includes first portion 540 and a second portion 542 interconnected via hinge 502. First portion 540, second portion 542, and hinge 502 may permit mobile device 500 to open (e.g., unfold), like a book, to reveal a foldable display 546. In some embodiments, first portion 540 may flip vertically (e.g., up), such that first portion 540 and second portion 540 are arranged one-on-top-of-the-other. Foldable display 546 may provide an additional connection point between the first portion 540 and the second portion 542. Foldable display 546 may be any flexible display (e.g., screen). In one or more arrangements, the foldable display 546 may be contiguous across the first portion 540 and the second portion 542. For instance, the pixels of the foldable display 546 may be continuous across the entire display 546, such that there is no margin, gap, and/or seam between the part of the foldable display 546 that is attached to the first portion 540 and the part of the foldable display 546 that is attached to the second portion 542. In some embodiments, foldable display 546 may comprise two displays configured to provide one contiguous display. The interior of mobile device 500 may also comprise an image capture device 544 which may be any suitable camera and/or video recorder capable of capturing and/or recording images and/or video, much like image capture device 506. Speaker 504, image capture device 506, and first display 508 are not shown in FIG. 5B since each of those components may be located on a surface opposite the surface that contains foldable display 546 (i.e., the surface of first portion 540 opening into the page).

When the application determines that mobile device 500 has been unfolded, the application may cause a second user interface to be displayed on a foldable display. The unfolding may be determined, for example, using one or more sensors on the mobile device, such as inertial sensors and/or a display driver. For example, the arrangement of the inertial sensors may indicate that the mobile device is unfolded. Further, the mobile device may have a single display driver with different outputs for the exterior display and the foldable display. The individual outputs may provide an indication (e.g., signal) to the application identifying whether the device is folded or unfolded. Alternatively, the mobile device may have separate display drivers for each display. The application may determine that the device is folded or unfolded based on which display driver is activated. In still further examples, the unfolding may be detected by a signal received from a switch activated when the front portion and the back portion of the mobile device are positioned relative to one another (e.g., side-by-side, on top of one another, etc.). FIG. 5C illustrates an example of the second user interface. FIG. 5C shows mobile device 500 that includes a first portion 540 and a second portion 542 interconnected via hinge 502. First portion 540 and/or second portion 542 may be separate enclosures (e.g., cases) configured to house the internal hardware (e.g., motherboard, memory, CPU, etc.) of the mobile device. Unfolded mobile device 500 may also include an image capture device 544 and a foldable display 546. Like image capture device 506, image capture device 544 may be any suitable camera and/or video recorder capable of capturing and/or recording images and/or video.

In response to determining that the foldable display has been opened, mobile device 500 may cause a second user interface 549 of an application to be presented on the foldable display 546. In some embodiments, foldable display 546 may comprise two displays configured to provide one contiguous display. The second user interface 549 may be the first user interface 509 adapted for a bigger display, such as foldable display 546. Like the first user interface 509, the second user interface 549 may include a navigation pane 510 with a plurality of buttons (e.g., home button 512, a desktop button 514, an apps button 516, a first button 518, a second button 520, a third button 522, and an exit button 524). Additionally, the second user interface 549 may include a plurality of tasks (e.g., first task 526, second task 528, third task 530, and fourth task 532). Upon opening the foldable display, first task 526, second task 528, third task 530, and/or fourth task 532 may slide out from under navigation pane 550, similar to a drawer opening, to be displayed in their entirety. It will be appreciated that animations other than "slide out" may be used. In addition to having their own space on foldable display 546, first task 526, second task 528, third task 530, and fourth task 532 may be interactive. In operation, a user may be able to select the first task 526. By selecting first task 526, an application may be opened. Additionally or alternatively, selecting the first task 526 may open and/or link to a document. For example, the user may select a task associated with reviewing a timesheet. The selected task may present an interface that allows the user to review the timesheet, make changes to the timesheet, send the timesheet back to the employee, and/or approve the timesheet. Additionally, the plurality of tasks may include additional information. For example, first task 526 may include a title of the task, a brief description of the task, a communication button, and a favorite button. The brief description of the task may provide a summary of the task. In some examples, the brief description may also include one or more applications necessary to complete the task. The communication button may allow the user to communicate with other users regarding the task. Selecting the communicate button may create a messaging session, group chat, or an email thread that allows the user to communicate with team members. The favorite button may allow the user to prioritize this task by marking it as a favorite. It will be appreciated that each task may include more, or fewer, options associated therewith.

Figure 6:
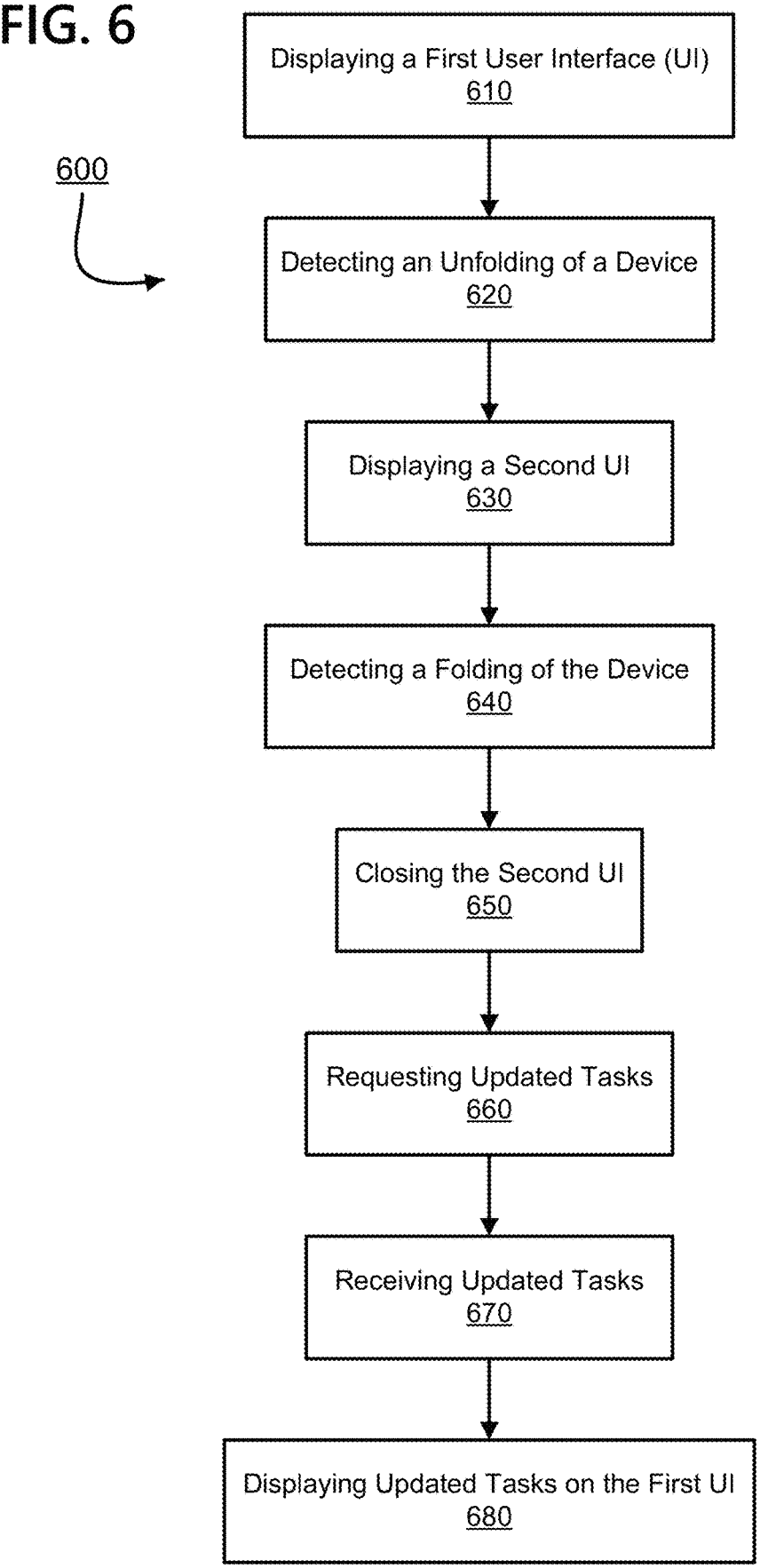
FIG. 6 depicts an illustrative process for updating a user interface in accordance with one or more illustrative aspects described herein.

FIG. 6 shows an example of a process for modifying a user interface in response to detecting an unfolding of a foldable display according to one or more aspects of the disclosure. Some or all of the steps of process 600 may be performed using one or more of the computing devices described herein, such as computing device 201. For instance, a mobile device with a foldable display, which may perform the process illustrated in FIG. 6 and/or one or more of the other processes described herein, may incorporate one or more aspects of computing device 201.

In step 610, a mobile device (e.g., an application executing on a mobile device) may display a first user interface. The first user interface may display a plurality of tasks. The first user interface may also include a navigation pane (e.g., navigation menu). The mobile device may display the first user interface in response to a user launching an application while a foldable display is closed. As discussed above with respect to FIGS. 6A and 6B, the application may be an enterprise productivity application, such as Citrix Workspace™. The plurality of tasks presented in the first user interface may be contextual tasks. The enterprise productivity application may select the plurality of contextual tasks based on which tasks are temporally relevant to and/or otherwise associated with projects, meetings, and/or other assignments that the user may be performing, supervising, and/or assigned to perform or supervise. Contextual tasks may be user-specific. Additionally, the contextual tasks may be generated by an enterprise server associated with the enterprise productivity application located on the mobile device. The contextual tasks may be generated based, in part, on the user's role with an organization and/or based on input from other user's, such as supervisors, colleagues, etc. Furthermore, the plurality of tasks may be displayed on a first display of the mobile device. The first display may be an exterior (e.g., outwardly) facing display of the mobile device that is smaller than a foldable display of the mobile device. Alternatively, the first display may be a portion (e.g., half) of a foldable display.

In step 620, the mobile device (e.g., the application executing on the mobile device) may detect an unfolding of the mobile device to activate or otherwise enable the foldable display. The unfolding may be detected, for example, in response to a foldable display being activated. Additionally or alternatively, the unfolding may be detected using one or more sensors on the mobile device, such as inertial sensors and/or a display driver. For example, the arrangement of the inertial sensors may indicate that the mobile device is unfolded. Further, the mobile device may have a single display driver with different outputs for the exterior display and the foldable display. The individual outputs may provide an indication (e.g., signal) as to whether the device is folded or unfolded. Alternatively, the mobile device may have separate display drivers for each display. The mobile device may determine whether the device is folded or unfolded based on which display driver is activated. In still further examples, the unfolding may be detected by a signal received from a switch activated when the front portion and the back portion of the mobile device are positioned relative to one another (e.g., side-by-side, on top of one another, etc.). In some embodiments, the first display (e.g., the outwardly facing display) may be disabled in response to detecting an unfolding of the mobile device. Disabling the first display may include shutting down the first display and/or disabling the touchscreen functionality of the first display. Disabling the first display may save power since the first display is inactive. Additionally, disabling the first display may prevent inadvertent inputs, for example, if the user were to touch the first display while working on the foldable display.

In step 630, the mobile device (e.g., the application executing on the mobile device) may display a second user interface a foldable display. As noted above with respect to FIG. 5, the second user interface may be the first user interface adapted for a bigger display, such as a foldable display. The second user interface may be part of an enterprise productivity application, such as Citrix Workspace™. The enterprise productivity application may provide a plurality of users secure, remote access to a plurality of virtual desktops executing in a cloud environment as discussed above with respect to FIGS. 3 and 4. Each of the plurality of users may use their respective virtual desktop to complete one or more tasks and/or projects. Additionally or alternatively, a user may complete one or more contextual tasks within the enterprise productivity application itself (e.g., Citrix Workspace). Similar to the first user interface discussed above, the second user interface may include a navigation pane (e.g. navigation menu). Additionally or alternatively, the second user interface may include the plurality of contextual tasks. In some embodiments, the second user interface may provide access to one or more virtual desktops and/or one or more virtual applications (which may, e.g., be selected for display by the mobile device and/or software based on such desktops and/or applications being temporally relevant to and/or otherwise associated with one or more of the contextual tasks). The user may perform one or more functions related to the plurality of contextual tasks via the second user interface.

In step 640, the mobile device (e.g., the application executing on the mobile device) may detect a folding of the foldable display to deactivate, shutdown, or otherwise disable the foldable display. As with detecting the unfolding, the mobile device may detect the folding, for example, based on the first display being activated, using one or more sensors on the mobile device, using a switch, or any equivalent thereof. The foldable display may be disabled in response to detecting the folding of the mobile device, which may include turning off the foldable display and/or disabling the touchscreen functionality of the foldable display. In step 650, the mobile device (e.g., the application executing on the mobile device) may close the second user interface. The second user interface may be closed, for example, based on or in response to detecting the folding of the mobile device. Closing the second user interface may include saving the work being performed, suspending execution of the applications, and/or saving the state of the user's workspace.

In step 660, the mobile device (e.g., the application executing on the mobile device) may request updated tasks for the user of the mobile device. The request for updated tasks may be based on the user having worked on and/or completed one or more of the contextual tasks displayed in either the first user interface and/or the second user interface. In this regard, the application may update the plurality of tasks displayed on the first user interface, for example, in response to the user closing the foldable device. The request may be transmitted to an enterprise productivity support server, such as server 206 described above. The request may include the user's username and/or any relevant information for identifying the user. In step 670, the mobile device (e.g., the application executing on the mobile device) may receive updated tasks for the user of the mobile device. Additionally or alternatively, the enterprise productivity support server may push updated tasks to the mobile device. The updated tasks may be generated and/or selected based, in part, on tasks completed, or worked on, by the user while in the workspace. The mobile device may generate an updated list of contextual tasks based on at least the information received from the enterprise productivity support server and the status of the tasks based on the work performed by the user. In step 680, the mobile device (e.g., the application executing on the mobile device) may display the updated list of contextual tasks on the first user interface. The first user interface may include the navigation pane (e.g. navigation menu), in addition to the updated list of contextual tasks. The updated tasks may reflect updated projects, meetings, and/or other assignments associated with the user.

Figure 7A:
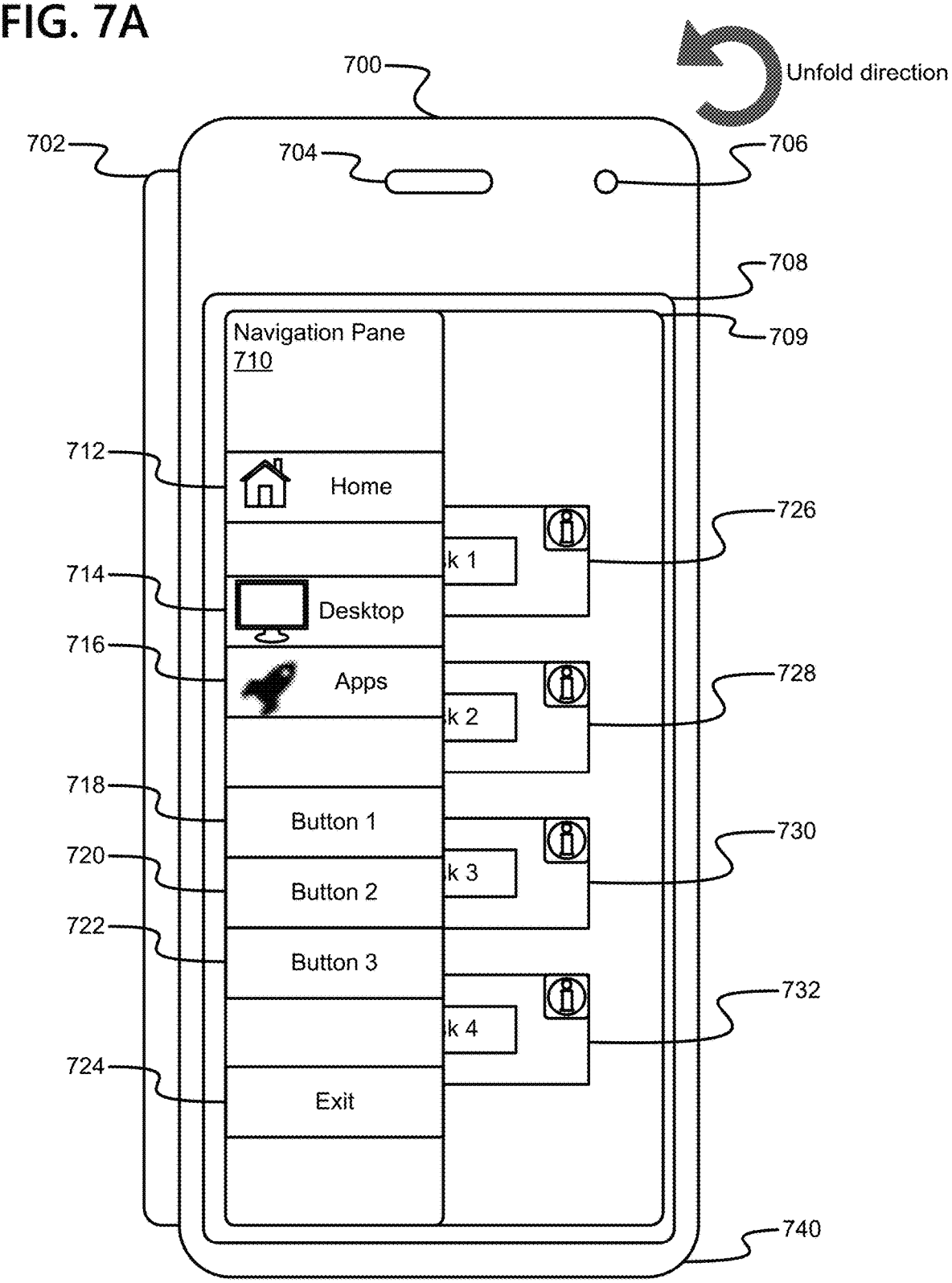
FIGS. 7A and 7B depict an illustrative example of updating a user interface in accordance with one or more illustrative aspects described herein.
Figure 7B:
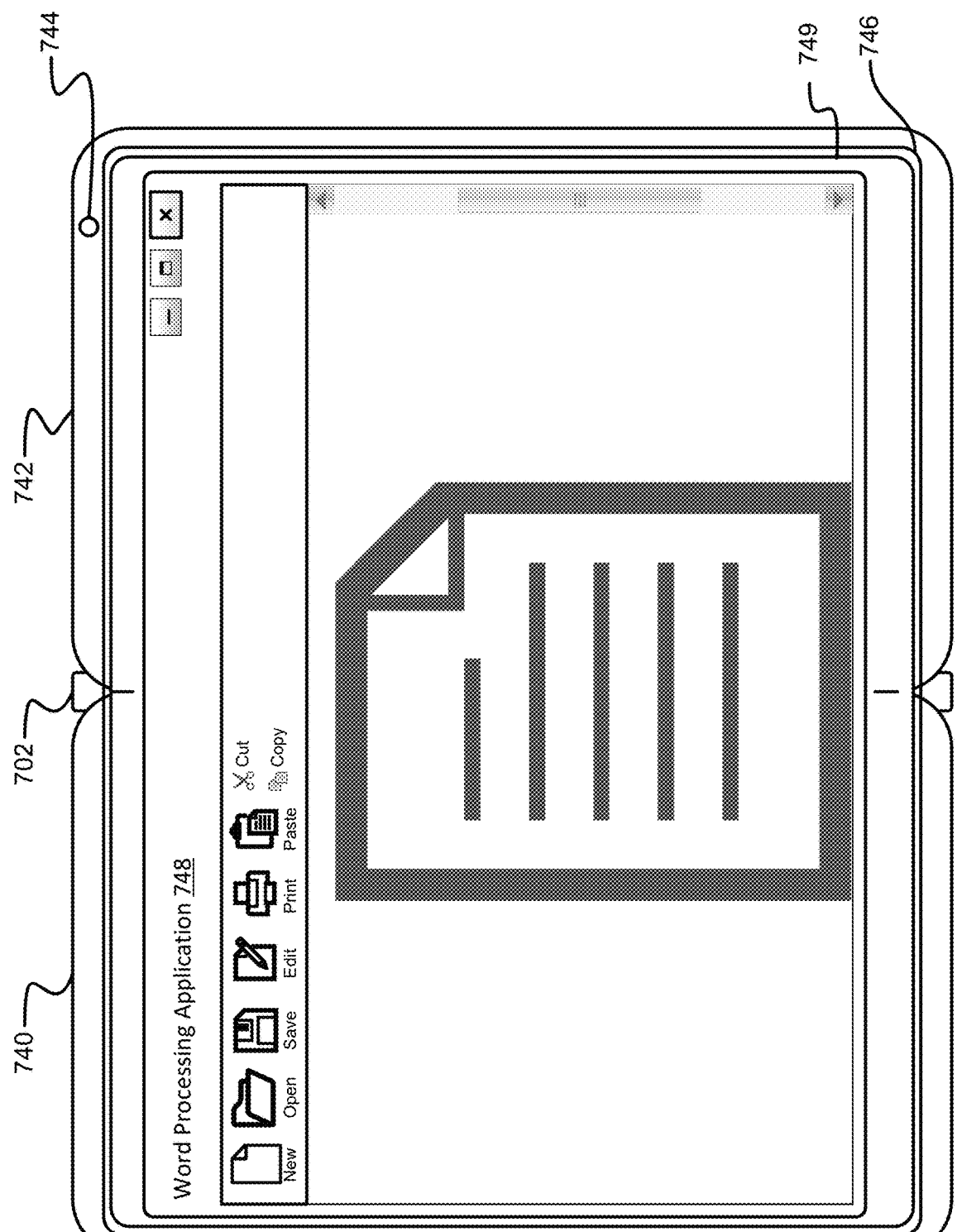

In some embodiments, the application may launch one or more applications and/or virtual applications needed to complete a task in response to detecting an unfolding of the mobile device. FIGS. 7A and 7B illustrate an example of launching an application and/or virtual application in response to unfolding a foldable display. Similar to FIG. 5A above, FIG. 7A shows a mobile device 700 that includes a foldable display (not shown). A first part 740 and a second part (which is not shown as it is behind first part 740) of mobile device 700 may be interconnected via hinge 702. Mobile device 700 may also include a speaker 704, an image capture device 706, and a first display 708. In a closed state, mobile device 700 may cause a first user interface 709 of an application (e.g., an enterprise productivity application) to be presented on the first display 708. The first user interface 709 may include a navigation pane 710 and a plurality of tasks (e.g., first task 726, second task 728, third task 730, and fourth task 732). Navigation pane 710, home button 712, desktop button 714, apps button 716, first button 718, second button 720, third button 722, and exit button 724 may correspond to navigation pane 510, home button 512, desktop button 514, apps button 516, first button 518, second button 520, third button 522, and exit button 524, respectively. Similarly, first task 726, second task 728, third task 730, and fourth task 732 may correspond to first task 526, second task 528, third task 530, and fourth task 532, respectively.

When the application determines that mobile device 700 has been unfolded, the application may cause an application and/or virtual application to be launched and displayed on a second user interface on a foldable display. FIG. 7B illustrates an example of the second user interface 749. Much like FIG. 5B described above, FIG. 7B shows mobile device 700, as well as a first portion 740 of mobile device 700 and a second portion 742 of mobile device 700 interconnected via hinge 702. Unfolded mobile device 700 may also include an image capture device 744 and a foldable display 746.

In response to determining that the foldable display is opened, mobile device 700 may cause a second user interface 749 of an application to be presented on the foldable display 746. The second user interface 749 may include the launched application, such as word processing application 748. While a word processing application is shown, it will be appreciated that any suitable application and/or virtual application may be launched in response to determining that the foldable display is opened. Word processing application 748 may be a virtual application accessed via the application (e.g., the enterprise productivity application) that generated the first and second user interfaces. In addition, the launched application (e.g., word processing application 748) may be selected by the enterprise productivity application and launched due to its association with a first task of a plurality of tasks. For example, the launched application (e.g., word processing application 748) may be an application that is needed and/or usable to complete a task of the plurality of tasks and/or a task with the highest priority amongst the plurality of tasks, and the enterprise productivity application may select and launch the application accordingly. In some embodiments, the launched application (e.g., word processing application 748) may be the last application the user accessed during a previous session, and the enterprise productivity application may select and launch the application accordingly. In some instances, a user may complete a task within the enterprise productivity application itself (e.g., without launching another application). The enterprise productivity application may present a user interface (e.g., the first user interface and/or the second user interface) from which a task can be completed. When the user has completed their work with the launched application, the user may close the foldable mobile device. Closing the foldable mobile device may cause the enterprise productivity application to save data associated with the launched application, and suspend and/or shutdown the launched application.

Figure 8:
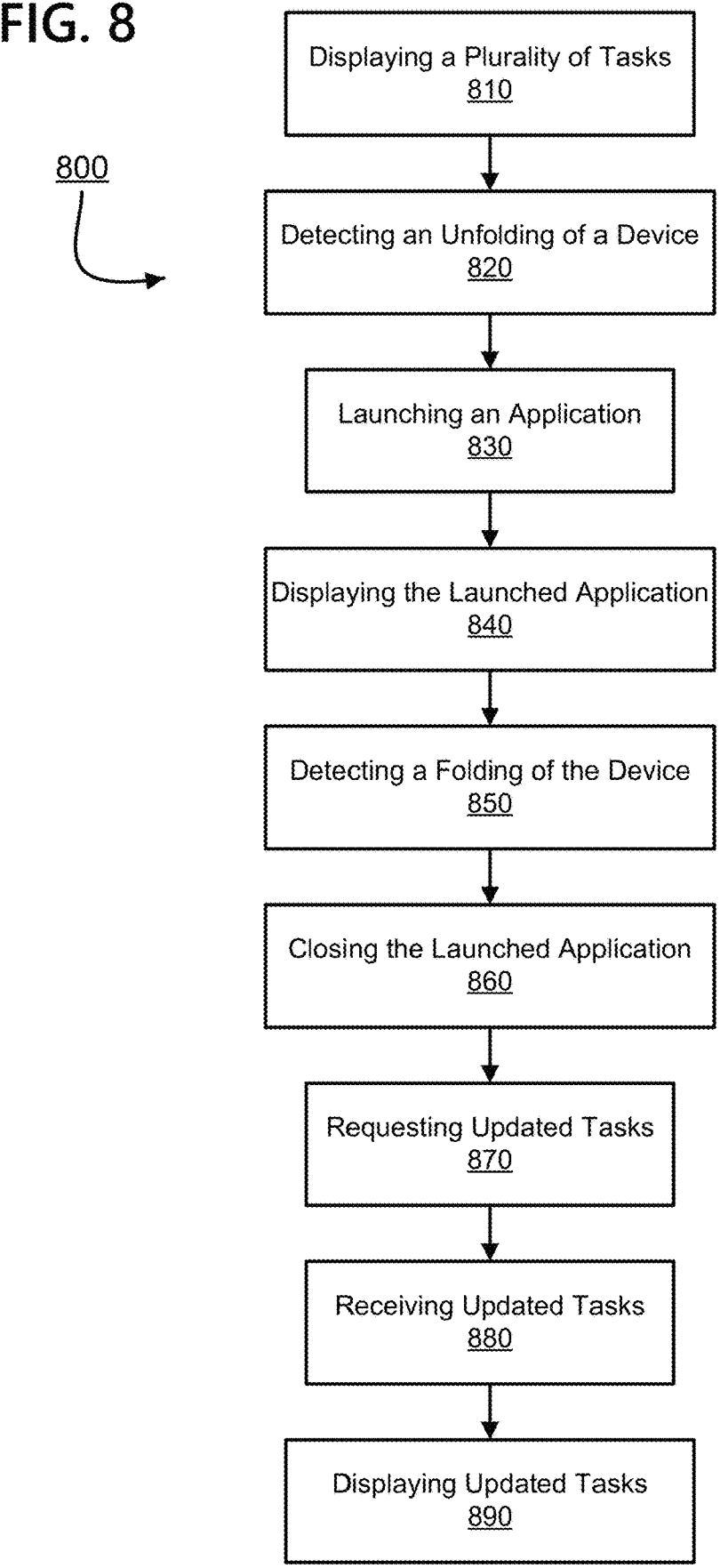
FIG. 8 depicts an illustrative process for updating a user interface in accordance with one or more illustrative aspects described herein.

FIG. 8 shows an example of a process for modifying a user interface in response to detecting an unfolding of a foldable display according to one or more aspects of the disclosure. Some or all of the steps of process 700 may be performed using one or more of the computing devices described herein, such as computing device 201, as discussed above.

In step 810, a mobile device (e.g., an enterprise productivity application executing on a mobile device) may display a first user interface that includes a plurality of tasks. The first user interface may be displayed in response to a user launching an application (e.g., an enterprise productivity application). In step 820, the mobile device (e.g., the enterprise productivity application executing on the mobile device) may detect an unfolding of the mobile device. In step 830, the mobile device (e.g., the enterprise productivity application executing on the mobile device) may launch an application and/or a virtual application. The application and/or virtual application may be launched in response to detecting the unfolding of the mobile device. In some instances, the launched application may be an application that is needed and/or usable to complete a first task of a plurality of tasks, and prior to launching the application, the enterprise productivity application may select the application to be launched based on identifying and/or determining that the application is needed and/or usable to complete the first task for the plurality of tasks. In other instances, the launched application may be an application that is needed and/or usable to complete a task with the highest priority amongst the plurality of tasks, and prior to launching the application, the enterprise productivity application may select the application to be launched based on identifying and/or determining that the application is needed and/or usable to complete the task with the highest priority amongst the plurality of tasks. In still further embodiments, the launched application may be an application to complete a task that the user worked on during a previous session, and prior to launching the application, the enterprise productivity application may select the application to be launched based on identifying and/or determining that the application is needed and/or usable to complete the task that the user worked on during the previous session. In some embodiments, a plurality of virtual applications may be launched to accomplish the first task.

In step 840, the launched application may be displayed in the second user interface. The user may then perform functions in the launched application on the mobile device. In examples where a plurality of virtual applications are launched, at least two of the virtual applications may be displayed simultaneously on the foldable display. When finished, the user may close the foldable mobile device.

In step 850, the mobile device (e.g., the enterprise productivity application executing on the mobile device) may detect a folding of the mobile device. In step 860, the mobile device (e.g., the enterprise productivity application executing on the mobile device) may close the launched application. The launched application may be closed, for example, based on or in response to detecting the closing of the foldable display. Closing the launched application may include saving data associated with the work performed by the user in the launched application and/or suspending the launched application. It will be appreciated that the user may close the launched application before folding the mobile device. In these examples, step 760 may be skipped.

In step 870, the mobile device (e.g., the enterprise productivity application executing on the mobile device) may request updated tasks for the user of the mobile device from one or more enterprise servers, such as server 206 discussed above. In some instances, the mobile device (e.g., the enterprise productivity application executing on the mobile device) may request updated tasks for the user of the mobile device in response to detecting the closing of the foldable display. The request may be transmitted to a server and include the user's username and/or other information for identifying the user, one or more credentials associated with the user (e.g., one or more single sign-on (SSO) credentials and/or other enterprise credentials), and/or other information. In step 880, the mobile device (e.g., the enterprise productivity application executing on the mobile device) may receive updated tasks for the user from the one or more enterprise servers. In step 890, the mobile device (e.g., the enterprise productivity application executing on the mobile device) may display the updated tasks for the user via the first user interface and based on the information received from the one or more enterprise servers.

Figure 9A:
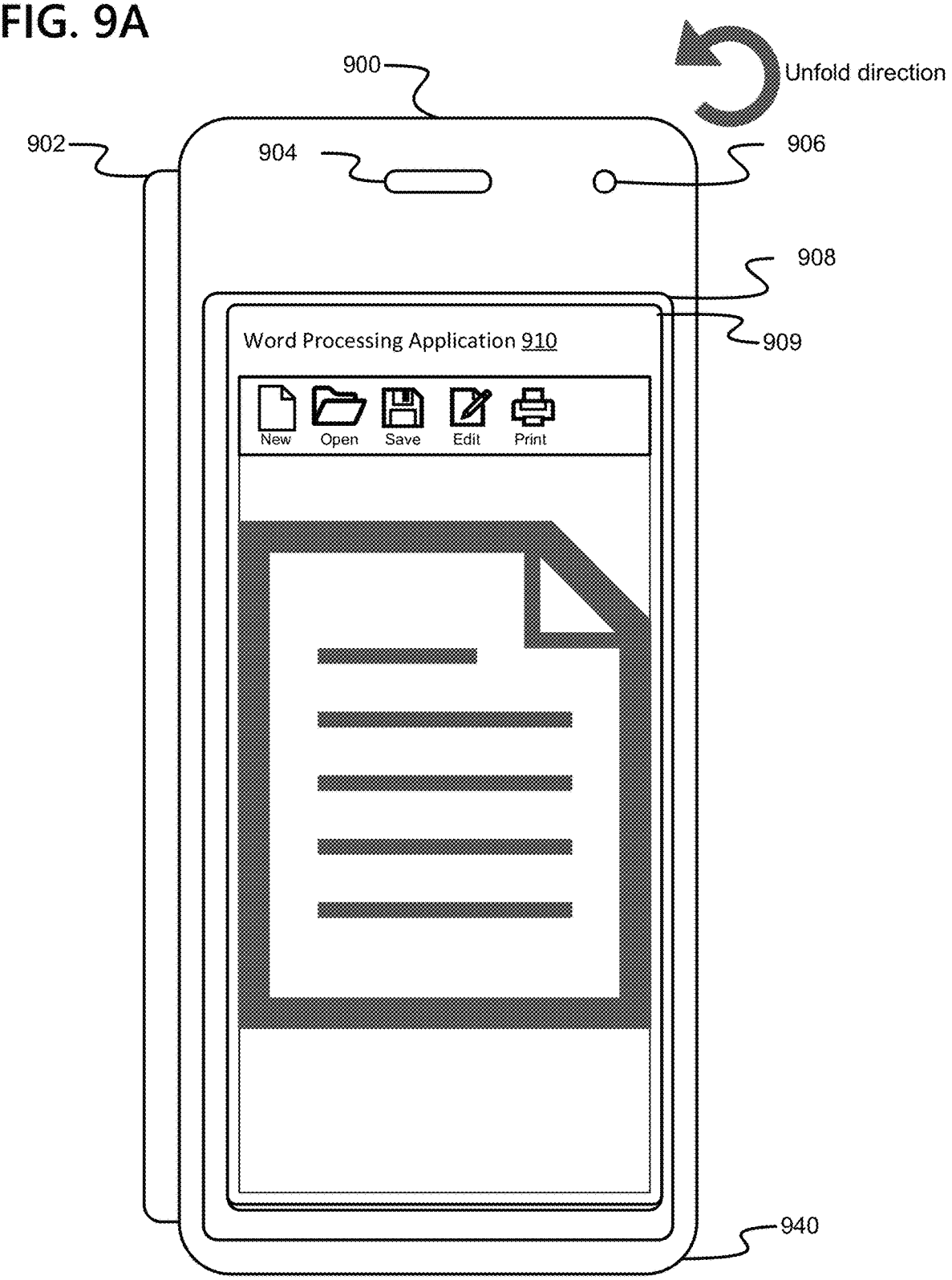
FIGS. 9A and 9B depict an illustrative example of updating a user interface in accordance with one or more illustrative aspects described herein.
Figure 9B:
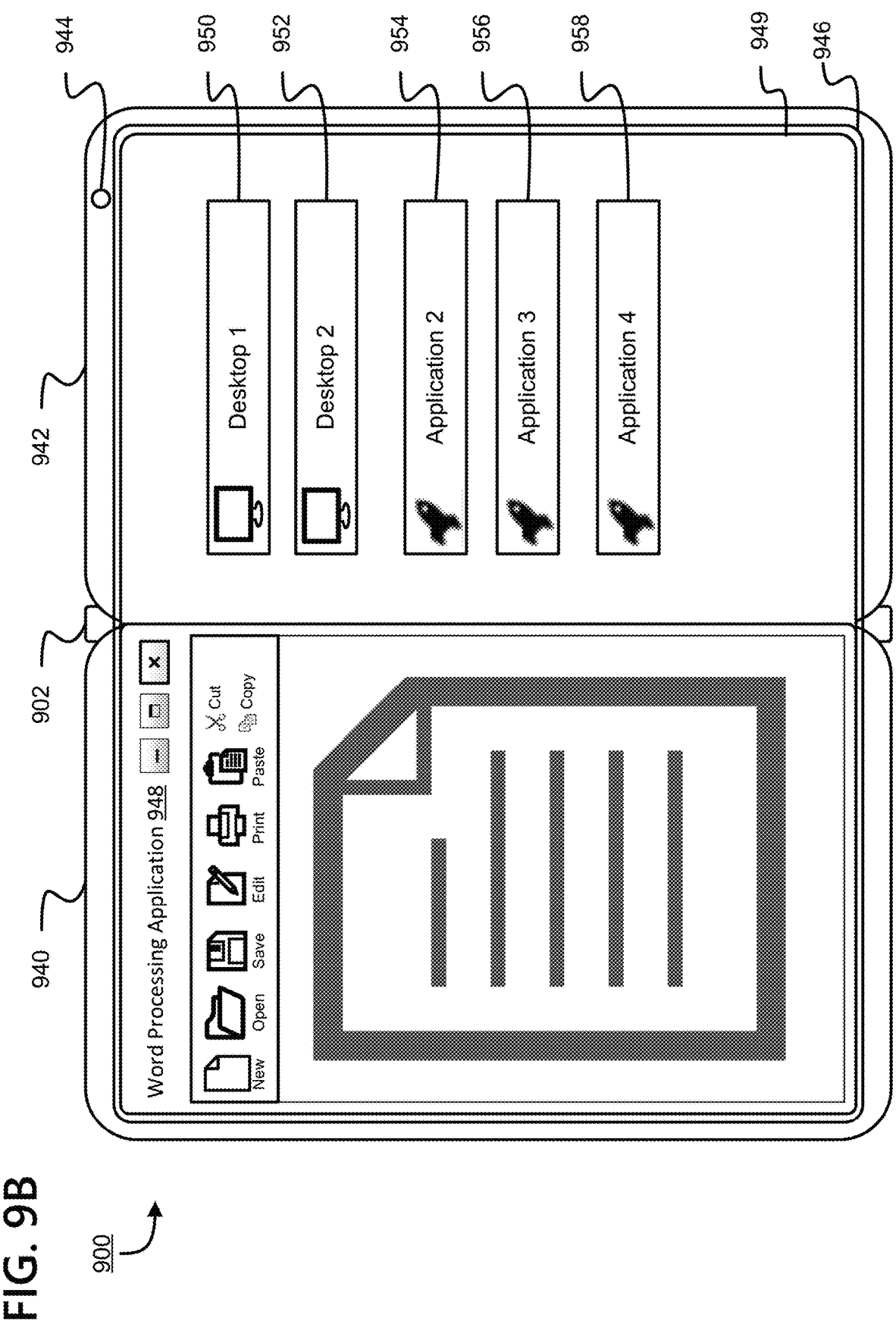

In some instances, the foldable mobile device may launch a virtual application (e.g., responsive to receiving user input requesting to launch the application), via an application executing on a foldable mobile device, while the foldable mobile device is closed. After the foldable mobile device launches the virtual application, the user may unfold the foldable mobile device to access a foldable display. The foldable mobile device may execute one or more actions in response to this unfolding action, as discussed below. FIGS. 9A and 9B illustrate an example of transitioning a user interface in response to unfolding a foldable display. Similar to FIGS. 5A and 7A above, FIG. 9A shows a mobile device 900 that includes a foldable display (not shown). A first part and a second part of mobile device 900 may be interconnected via hinge 902. Mobile device 900 may also include a speaker 904, an image capture device 906, and a first display 908. When mobile device 900 is closed, a first user interface 909 of an application may be displayed via the first display 908. The first user interface 909 may include a virtual application, such as word processing application 910. Accordingly, the user may be able to access the virtual application via the first user interface 909.

While the user may be able to access the virtual application through the first user interface of the enterprise productivity application, the user may have an improved user experience by accessing the virtual application via a second user interface displayed on the foldable display of mobile device 900. FIG. 9B illustrates an example of the second user interface 949. FIG. 9B shows mobile device 900 that includes a first portion 940 and a second portion 942 interconnected via hinge 902. As discussed above, mobile device 900 may also include image capture device 944 and foldable display 946.

Upon opening of mobile device 900, mobile device 900 may update the second user interface 949 of the enterprise productivity application so as to cause the virtual, Software-As-A-Service (SAAS) or web application (e.g., word processing application 948) to be displayed on a portion (e.g., half) of foldable display 946. As illustrated in FIG. 9B, mobile device 900 may display word processing application 948 on first portion 940 section of foldable display 946. Mobile device 900 may display the second user interface 949 on the second portion 942 section of foldable display 942, which may present the user with a plurality of options. As shown, the second user interface 949 includes a first desktop button 950, a second desktop button 952, a first application button 954, a second application button 956, and a third application button 958. When selected, first desktop button 950 may cause a first virtual desktop to be displayed on the portion 942 section of foldable display 946. Similarly, second desktop button 952 may cause a second virtual desktop to be displayed on the second portion 942 section of foldable display 946. First application button 954, second application button 956, and third application button 958 may each launch a different application in the second portion 942 section of foldable display 946. In some embodiments, a plurality of contextual tasks may be displayed adjacent to the virtual application (e.g., word processing application 948). The plurality of contextual tasks may be displayed in lieu of, or together with, the options discussed above. By presenting the second user interface 949 in this manner, an enterprise productivity application may provide an optimized display that allows a user to work on two virtual applications concurrently. This may improve the user experience when working on a foldable mobile device and increase the user's productivity.

Figure 10:
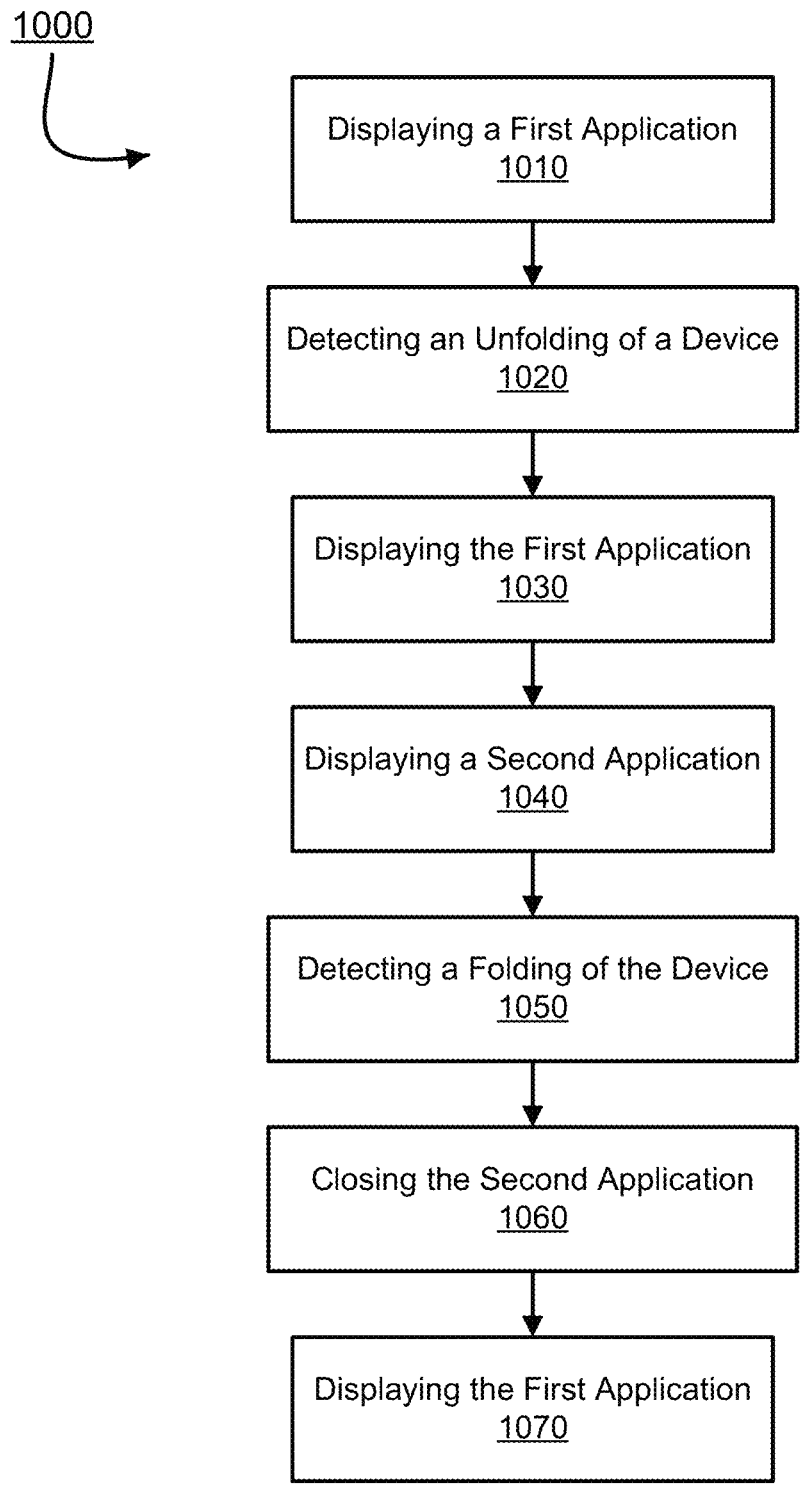
FIG. 10 depicts an illustrative process for updating a user interface in accordance with one or more illustrative aspects described herein.

FIG. 10 shows an example of a process for modifying a user interface in response to detecting an unfolding of a foldable display according to one or more aspects of the disclosure. Some or all of the steps of process 1000 may be performed using one or more computing devices as described herein, such as computing device 201.

In step 1010, a mobile device may display a first application. The first application may be a virtual application launched via an enterprise productivity application executing on the mobile device. The first application may be a productivity application to execute one or more tasks with projects, meetings, and/or other assignments the user may be performing. The first application may be displayed on a first display of the mobile device. As noted above, the first display may be an exterior (e.g., outwardly) facing display or a portion (e.g., half) of a foldable display.

In step 1020, the mobile device (e.g., the application executing on the mobile device) may detect an opening of the foldable display. The opening may be determined, for example, in response to a foldable display being activated, using one or more sensors (e.g., inertial sensors), or based on a switch being activated. The first display (e.g., the outwardly facing display) may be disabled in response to detecting an unfolding of the mobile device. Disabling the first display may include shutting down the first display and/or disabling the touchscreen functionality of the first display.

In step 1030, the mobile device (e.g., the enterprise productivity application executing on the mobile device) may display the first application on a foldable display. The mobile device may display the first application as part of a second user interface configured for the foldable display. In some embodiments, the mobile device may display the first application on the entirety of the foldable display. In other embodiments, the mobile device (e.g., the enterprise productivity application executing on the mobile device) may display the first application on a first portion (e.g., first half) of the foldable display. In step 1040, the mobile device (e.g., the enterprise productivity application executing on the mobile device) may display a second application on the foldable display. Much like the first application, the second application may be a virtual application configured to allow the user to complete one or more assigned tasks. The mobile device may display the second application on a second portion (e.g., second half) of the foldable display. Both applications may execute concurrently. While both the first application and the second application execute, the user may complete one or more tasks. When the user finishes the task, the user may fold the mobile device.

In step 1050, the mobile device (e.g., the enterprise productivity application executing on the mobile device) may detect the folding of the mobile device. In step 1050, the mobile device (e.g., the enterprise productivity application executing on the mobile device) may close the second application. The enterprise productivity application may close the second application based on or in response to detecting the folding of the mobile device. The enterprise productivity application may save and/or suspend the work being performed in the second application prior to closing the second application. It will be appreciated that the user may close the second application before closing the foldable mobile device. In these examples, step 1060 may be skipped.

In step 1070, the mobile device (e.g., the application executing on the mobile device) may display the first application. The application executing on the mobile device may return to a state that the application was in prior to detecting the opening of the foldable display. In this regard, the mobile device may display one or more applications, content, and/or other information that was displayed before the mobile device was unfolded. By returning to the previous state, the application may provide a better user experience via the user interface.

Figure 11A:
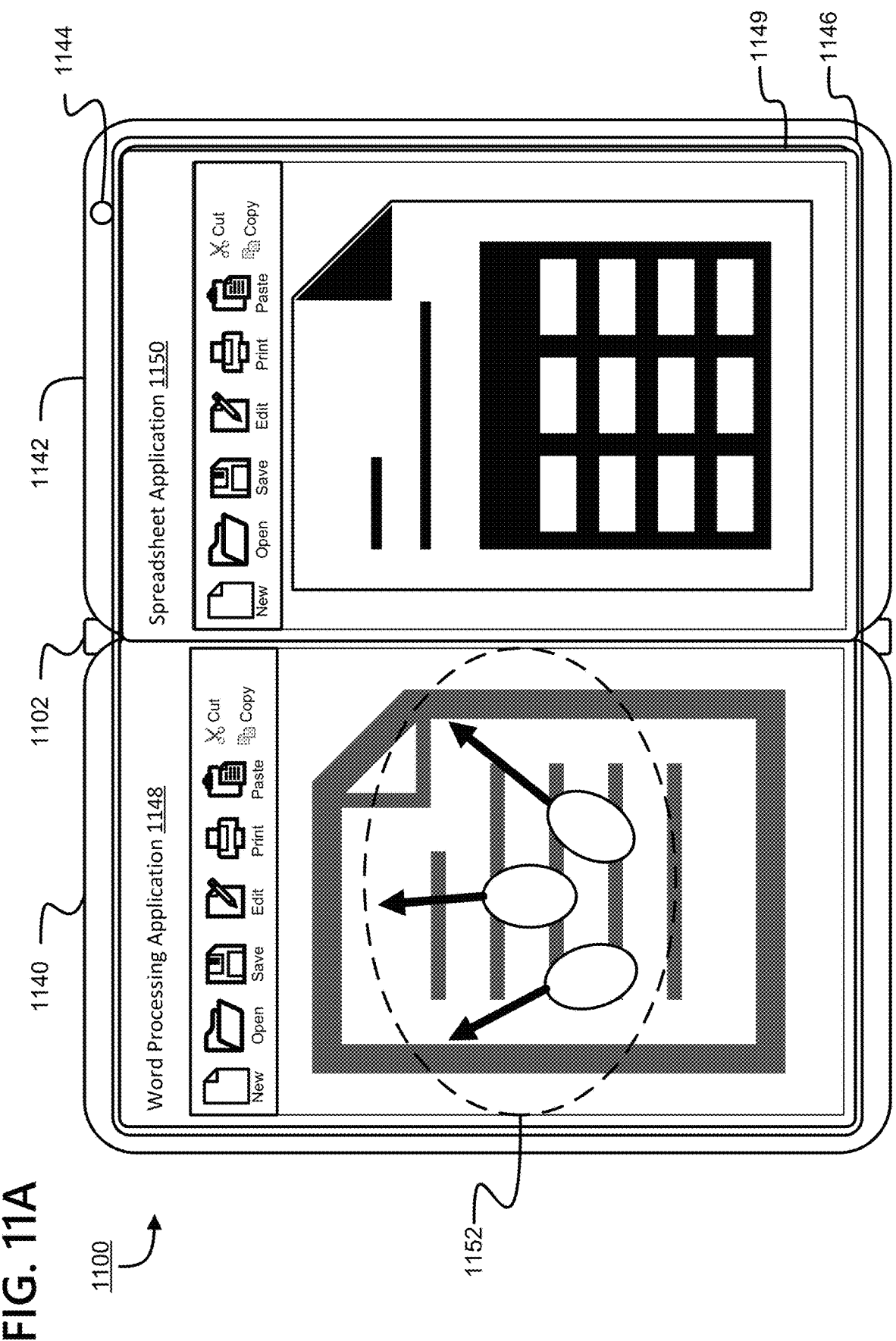
FIGS. 11A and 11B depict an illustrative example of updating a user interface based on an input in accordance with one or more illustrative aspects described herein.
Figure 11B:
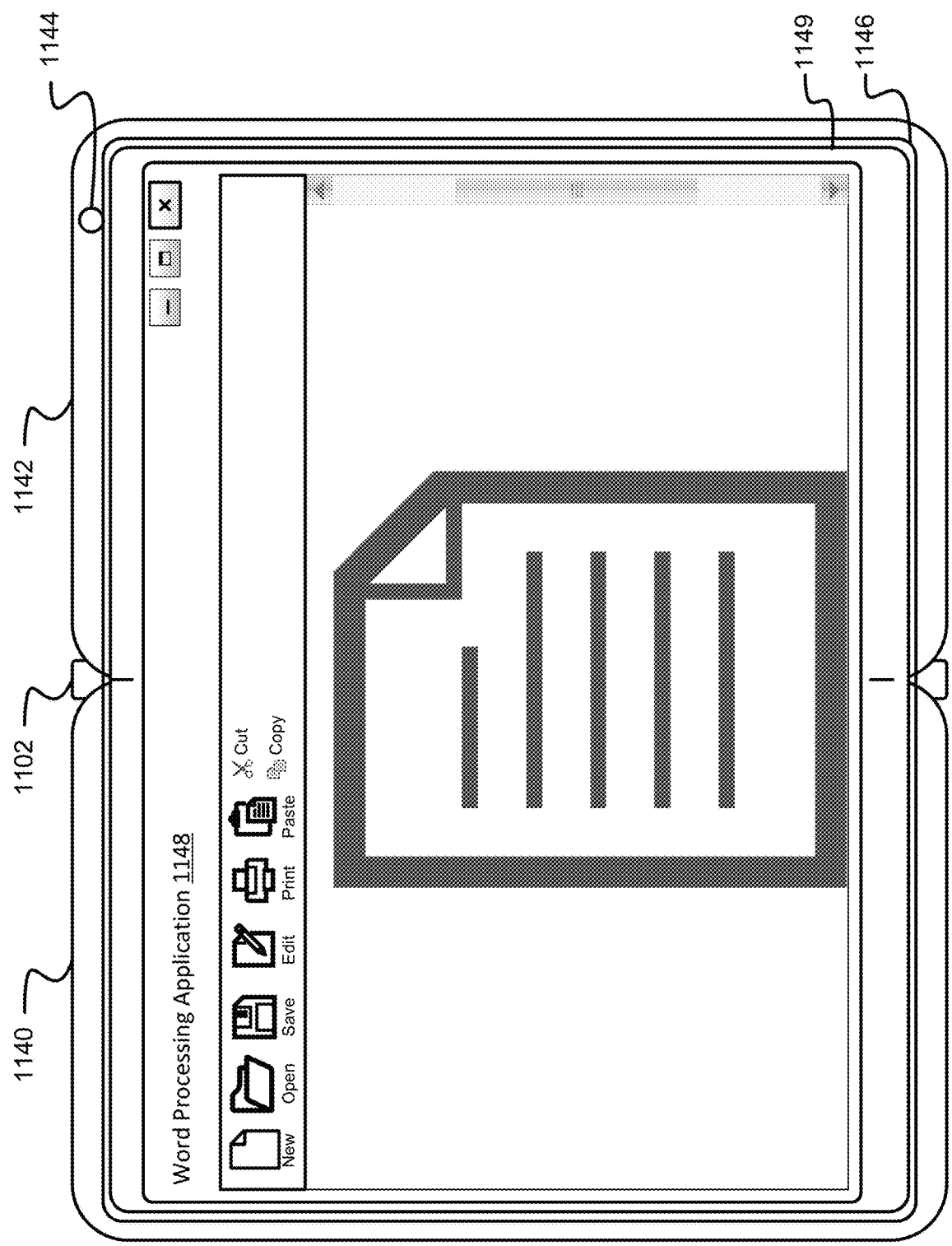

When the enterprise productivity application has two virtual applications open simultaneously, the enterprise productivity application may maximize one of the virtual applications on the foldable display, for example, in response to an input received from a user. FIGS. 11A and 11B illustrate an example of maximizing a virtual application in response to detecting a gesture input. FIG. 11A shows mobile device 1100 that includes a first portion 1140 and a second portion 1142 interconnected via hinge 1102. Mobile device 1100 may include image capture device 1144 and foldable display 1146. Foldable display 1146 may display a second user interface 1149 associated with the enterprise productivity application. The enterprise productivity application may display a first virtual application (e.g., word processing application 1148) and a second virtual application (e.g., spreadsheet application 1150) in the second user interface 1149. While a second virtual application is shown in FIG. 11A, it will be appreciated that a plurality of contextual tasks, a virtual desktop, or any other options may be displayed on the second portion of foldable display 1146. FIG. 11A also shows gesture input 1152. Gesture input 1152 may be a three-finger swipe out, a three-finger push out, a three-finger fan out, or any equivalent thereof. In operation, a user may put three fingers on the virtual application that the user would like to maximize and fan out the fingers. As shown in FIG. 11B, the mobile device may maximize the word processing application 1148 based on the received gesture input.

Figure 12:
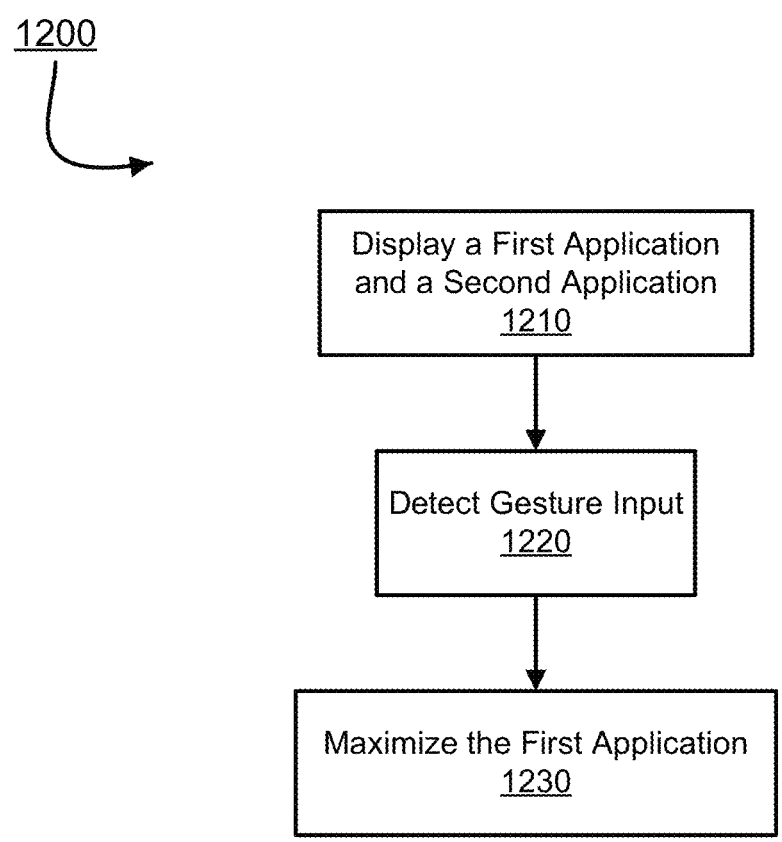
FIG. 12 depicts an illustrative process for updating a user interface in response to an input in accordance with one or more illustrative aspects described herein.

FIG. 12 shows an example of a process for maximizing a virtual application in response to a gesture input according to one or more aspects of the disclosure. Some or all of the steps of process 1200 may be performed using one or more computing devices as described herein, such as computing device 201.

In step 1210, the mobile device (e.g., the application executing on the mobile device) may display a first user interface that includes a first virtual application and a second virtual application on a foldable display. The mobile device may be executing the first virtual application and the second virtual application concurrently. In step 1220, the mobile device (e.g., the enterprise productivity application executing on the mobile device) may detect a gesture input from the user. The gesture input may be a three-finger swipe out, a three-finger push out, a three-finger fan out, or any equivalent thereof. In some examples, the gesture input may be two-finger swipe out, a two-finger push out, a two-finger fan out, or any equivalent thereof. In response to detecting the gesture input, the mobile device may maximize the first virtual application in step 1230. In this regard, the first virtual application may occupy the entirety of the foldable display.

Figure 13A:
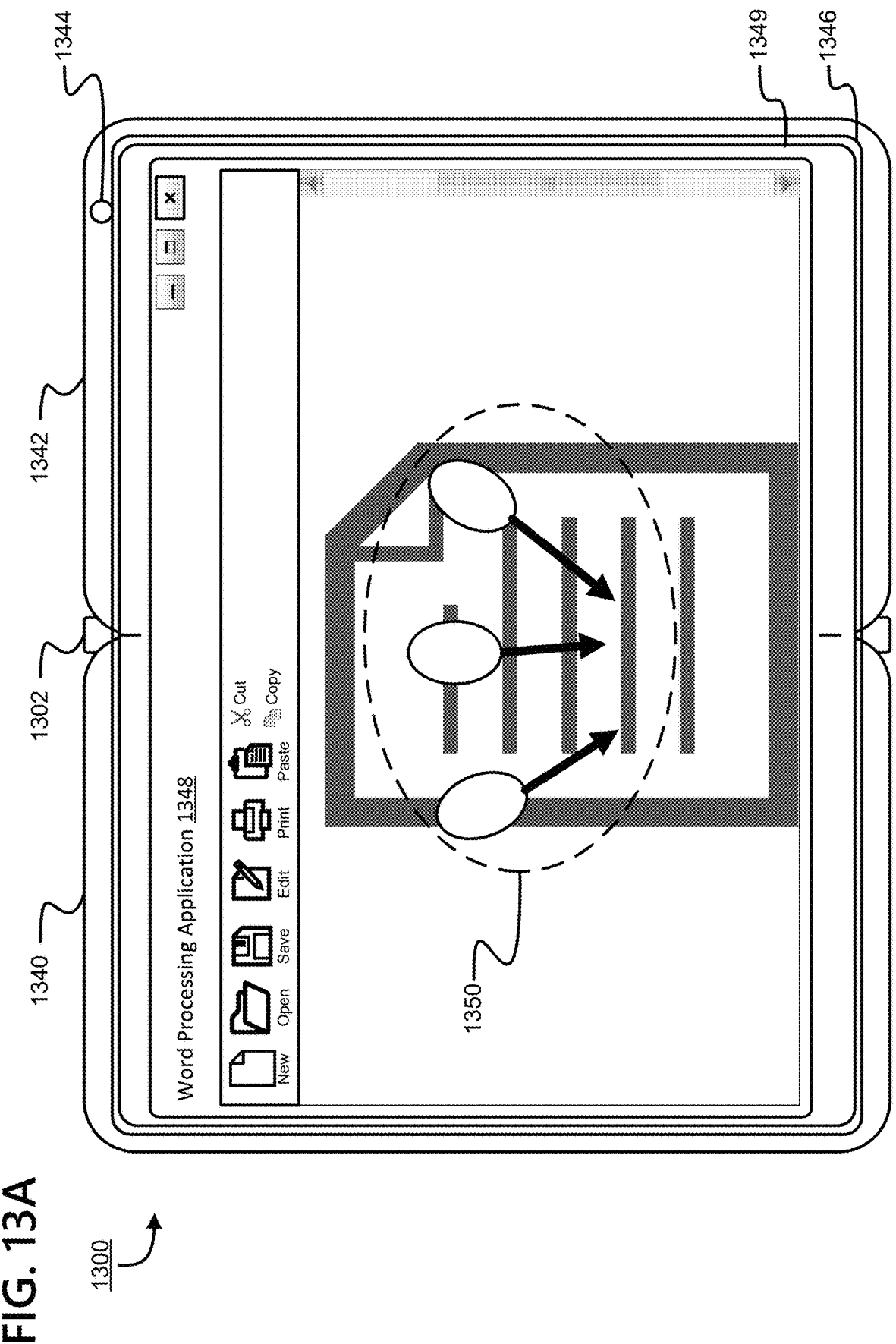
FIGS. 13A and 13B depict an illustrative example of updating a user interface based on an input in accordance with one or more illustrative aspects described herein.
Figure 13B:
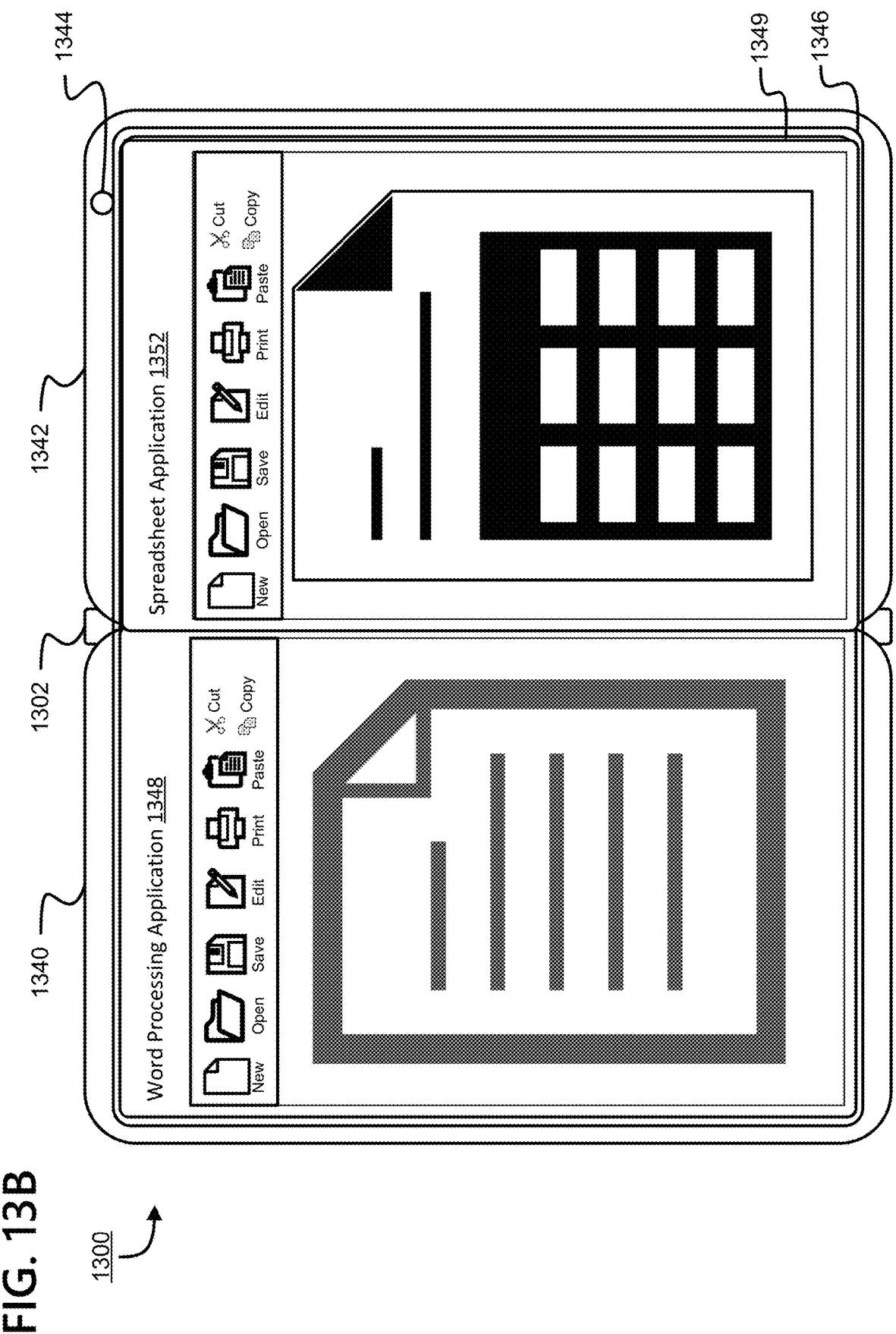

After maximizing a first virtual application, a user may want to minimize the first virtual application to work on both the first virtual application and the second virtual application. FIGS. 13A and 13B illustrate an example of minimizing a virtual application in response to detecting a gesture input. FIG. 13A shows mobile device 1300 that includes a first portion 1340 and a second portion 1342 interconnected via hinge 1302, image capture device 1344, and foldable display 1346. Foldable display 1346 may display a second user interface 1349 that includes a first virtual application (e.g., word processing application 1348). FIG. 13A also shows gesture input 1350. Gesture input 1350 may be a three-finger pull in, a three-finger pinch, a three-finger fan in, or any equivalent thereof. In operation, a user may put three fingers on the virtual application that the user would like to minimize and pull their fingers inward. As shown in FIG. 13B, word processing application 1348 may be minimized to a portion of foldable display 1346 in response to the received gesture input. Spreadsheet application 1352, or any other suitable display discussed herein, may be displayed adjacent to the word processing application 1348 based on the received gesture input.

Figure 14:
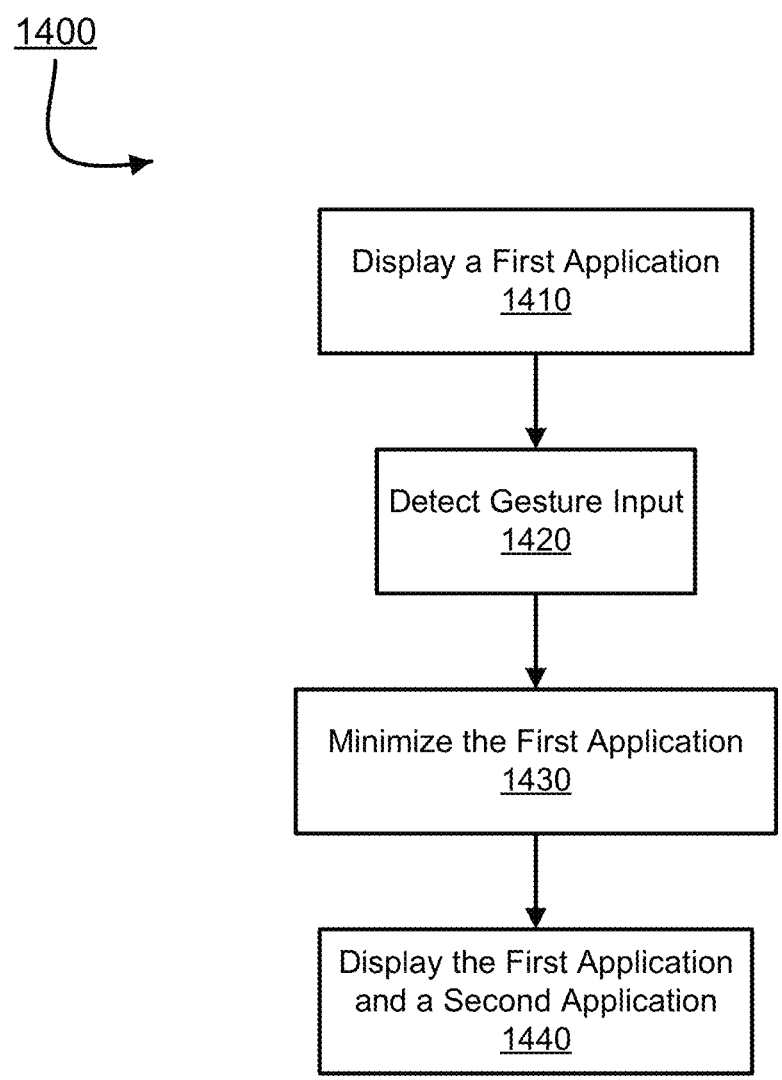
FIG. 14 depicts an illustrative process for updating a user interface in response to an input in accordance with one or more illustrative aspects described herein.

FIG. 14 shows an example of a process for minimizing a virtual application in response to a gesture input according to one or more aspects of the disclosure. Some or all of the steps of process 1400 may be performed using one or more computing devices as described herein, such as computing device 201.

In step 1410, the mobile device (e.g., the enterprise productivity application executing on the mobile device) may display a first user interface with a first virtual application. The first virtual application may occupy the entirety of the foldable display. In step 1420, the mobile device (e.g., the enterprise productivity application executing on the mobile device) may detect a gesture input from the user. As discussed above, the gesture input may be a three-finger pull in, a three-finger pinch, a three-finger fan in, or any equivalent thereof. In some examples, the gesture input may be two-finger swipe in, a two-finger pull in, a two-finger fan in, or any equivalent thereof. In response to detecting the gesture input, the mobile device (e.g., the enterprise productivity application executing on the mobile device) may minimize the first virtual application in step 1430. In step 1440, the mobile device (e.g., the enterprise productivity application executing on the mobile device) may display the first virtual application and a second virtual application on the foldable display.

The above-described processes, techniques, methods, and systems describe an application that adapts a user interface based on whether a foldable mobile device is folded or unfolded. Moreover, while the above described examples have been discussed in the context of a foldable device, it will be appreciated that the techniques described above may be applicable to mobile devices configured to pair with a desktop computer and/or an external monitor. In these instances, the desktop computer and/or the external monitor may operate in a similar capacity to the second portion of the foldable display described above. By adapting to the different displays, the application improves users' experiences working with the virtual applications.

The following paragraphs describe examples of methods that may be implemented in accordance with the present disclosure.

Clause 1. A computing device may display a first user interface on a display of the computing device. The first user interface may comprise an indication of tasks for a plurality of applications hosted on a remote server. The computing device may display a second user interface a foldable display of the computing device in response to a change in position of at least one of a first portion and a second portion of the foldable display. The second user interface may comprise the tasks for the plurality of applications as indicated by the first user interface. The computing device may provide data to an application hosted by the remote server and associated with at least one of the tasks displayed within the second user interface to initiate execution of the at least one task by the application in response to receipt of an input on the foldable display.

Clause 2. The method of clause 1, wherein the first and second user interfaces may be associated with an enterprise productivity application associated with an enterprise productivity support server.

Clause 3. The method of any one of clauses 1 or 2, wherein the first user interface comprises a navigation menu presented concurrently with the indication of tasks for the plurality of applications.

Clause 4. The method of any one of clauses 1-3, wherein the input comprises an approval of the at least one task.

Clause 5. The method of any one of clauses 1-4, wherein initiating execution of the at least one task further comprises launching a first application associated with the at least one task.

Clause 6. The method of any one of clauses 1-5, further comprising launching a second application associated with the at least one task, wherein the first application and the second application are displayed on the both the first portion and the second portion of the foldable display simultaneously.

Clause 7. The method of any one of clauses 1-6, wherein the first application associated with the at least one task is displayed on both the first portion and the second portion of the foldable display.

Clause 8. The method of any one of clauses 1-7, further comprising receiving, from a user of the computing device, a gesture input, wherein the gesture input is a three-finger fan in; and causing, based on the received gesture input, the first application to be displayed on the first portion of the foldable display.

Clause 9. The method of any one of clauses 1-8, wherein the first application associated is displayed on the first portion of the foldable display.

Clause 10. The method of any one of clauses 1-9, further comprising displaying additional information on the second portion of the foldable display, wherein the additional information comprises at least one of the indication of tasks for the plurality of applications, a second application, or a desktop.

Clause 11. The method of any one of clauses 1-10, further comprising receiving, from a user of the computing device, a gesture input; and causing, based on the received gesture input, the first application to be displayed on both the first portion and the second portion of the foldable display.

Clause 12. The method of any one of clauses 1-11, further comprising transmitting, to an enterprise productivity support server and in response to a second change in position of at least one of the first and second portions the foldable display, a request for updated tasks for the plurality of applications hosted on the remote server; receiving, from the enterprise productivity support server, a response comprising the updated tasks for the plurality of applications; and displaying the first user interface on the first portion of the foldable display, wherein the first user interface comprises an updated indication of tasks for the plurality of applications.

Clause 13. The method of any one of clauses 1-12, wherein the tasks are user-specific and generated by an enterprise productivity support server based on a user's role and input received from other users.

Clause 14. The method of any one of clauses 1-13, wherein the tasks for the plurality of applications are disabled in the first user interface.

Clause 15. The method of any one of clauses 1-14, further comprising enabling, by the computing device, the tasks for the plurality of applications in the second user interface.

Clause 16. A computing device may display a first user interface on a first portion of a foldable display of the computing device. The first user interface may comprise an indication of tasks for a plurality of applications hosted on a remote server. The computing device may display a second user interface on the first portion and a second portion of the foldable display in response to a change in position of at least one of the first and second portions of the foldable display. The second user interface may comprise the tasks for the plurality of applications as indicated by the first user interface. The computing device may provide data to an application hosted by the remote server and associated with at least one of the tasks displayed within the second user interface to initiate execution of the at least one task by the application in response to receipt of an input on the foldable display.

Clause 17. The method of clause 16, wherein the first and second user interfaces may be associated with an enterprise productivity application associated with an enterprise productivity support server.

Clause 18. The method of any one of clauses 16 or 17, wherein the first user interface comprises a navigation menu presented concurrently with the indication of tasks for the plurality of applications.

Clause 19. The method of any one of clauses 16-18, wherein the input comprises an approval of the at least one task.

Clause 20. The method of any one of clauses 16-19, wherein initiating execution of the at least one task further comprises launching a first application associated with the at least one task.

Clause 21. The method of any one of clauses 16-20, further comprising launching a second application associated with the at least one task, wherein the first application and the second application are displayed on the both the first portion and the second portion of the foldable display simultaneously.

Clause 22. The method of any one of clauses 16-21, wherein the first application associated with the at least one task is displayed on both the first portion and the second portion of the foldable display.

Clause 23. The method of any one of clauses 16-22, further comprising receiving, from a user of the computing device, a gesture input, wherein the gesture input is a three-finger fan in; and causing, based on the received gesture input, the first application to be displayed on the first portion of the foldable display.

Clause 24. The method of any one of clauses 16-23, wherein the first application associated is displayed on the first portion of the foldable display.

Clause 25. The method of any one of clauses 16-24, further comprising displaying additional information on the second portion of the foldable display, wherein the additional information comprises at least one of the indication of tasks for the plurality of applications, a second application, or a desktop.

Clause 26. The method of any one of clauses 16-25, further comprising receiving, from a user of the computing device, a gesture input; and causing, based on the received gesture input, the first application to be displayed on both the first portion and the second portion of the foldable display.

Clause 27. The method of any one of clauses 16-26, further comprising transmitting, to an enterprise productivity support server and in response to a second change in position of at least one of the first and second portions of the foldable display, a request for updated tasks for the plurality of applications hosted on the remote server; receiving, from the enterprise productivity support server, a response comprising the updated tasks for the plurality of applications; and displaying the first user interface on the first portion of the foldable display, wherein the first user interface comprises an updated indication of tasks for the plurality of applications.

Clause 28. The method of any one of clauses 16-27, wherein the tasks are user-specific and generated by an enterprise productivity support server based on a user's role and input received from other users.

Clause 29. The method of any one of clauses 16-28, wherein the tasks for the plurality of applications are disabled in the first user interface.

Clause 30. The method of any one clauses 16-29, further comprising enabling, by the computing device, the tasks for the plurality of applications in the second user interface.

The following paragraphs describe examples of apparatuses that may be implemented in accordance with the present disclosure.

Clause 31. An apparatus comprising at least one processor, a housing including a display and a foldable display, and memory storing instructions is disclosed. The instructions, when executed by the at least one processor, cause the computing device to display a first user interface on the display of the computing device, wherein the first user interface comprises an indication of tasks for a plurality of applications hosted on a remote server; display a second user interface on the foldable display in response to a change in position of at least one of a first portion and a second portion of the foldable display, wherein the second user interface comprises the tasks for the plurality of applications as indicated by the first user interface; and provide data to an application hosted by the remote server and associated with at least one of the tasks displayed within the second user interface to initiate execution of the at least one task by the application in response to receipt of an input on the foldable display.

Clause 32. The apparatus of clause 31, wherein the memory stores additional computer-readable instructions that, when executed by the at least one processor, cause the computing device to launch a first application associated with the at least one task based on receipt of the input on the foldable display.

Clause 33. The apparatus of any one of clauses 31 or 32, wherein the memory stores additional computer-readable instructions that, when executed by the at least one processor, cause the computing device to transmit, to an enterprise productivity support server, a request for updated tasks for the plurality of applications in response to a second change in position of at least one of the first and second portions of the foldable display; receive, from the enterprise productivity support server, a response comprising the updated tasks for the plurality of applications hosted on the remote server; and displaying the first user interface on the first portion of the foldable display, wherein the first user interface comprises an updated indications of tasks for the plurality of applications.

Clause 34. An apparatus comprising at least one processor, a first display, a foldable display, and memory storing instructions is disclosed. The instructions, when executed by the at least one processor, cause the computing device to display a first user interface on a first portion of a foldable display of the computing device, wherein the first user interface comprises an indication of tasks for a plurality of applications hosted on a remote server; display a second user interface on the first portion and a second portion of the foldable display in response to a change in position of at least one of the first and second portions of the foldable display, wherein the second user interface comprises the tasks for the plurality of applications as indicated by the first user interface; and provide data to an application hosted by the remote server and associated with at least one of the tasks displayed within the second user interface to initiate execution of the at least one task by the application in response to receipt of an input on the foldable display.

Clause 35. The apparatus of clause 34, wherein the memory stores additional computer-readable instructions that, when executed by the at least one processor, cause the computing device to launch a first application associated with the at least one task based on receipt of the input on the foldable display.

Clause 36. The apparatus of any one of clauses 34 or 35, wherein the memory stores additional computer-readable instructions that, when executed by the at least one processor, cause the computing device to transmit, to an enterprise productivity support server, a request for updated tasks for the plurality of applications in response to a second change in position of at least one of the first and second portions of the foldable display; receive, from the enterprise productivity support server, a response comprising the updated tasks for the plurality of applications hosted on the remote server; and displaying the first user interface on the first portion of the foldable display, wherein the first user interface comprises an updated indications of tasks for the plurality of applications.

The following paragraphs describe examples of computer-readable media that may be implemented in accordance with the present disclosure.

Clause 37. A non-transitory computer-readable medium storing instructions that, when executed, cause a system to cause a plurality of contextual tasks to be presented on a first display, wherein the plurality of contextual tasks comprises a first task associated with a user, detect an unfolding of a foldable display, launch a first application associated with the first task in response to detecting the unfolding of the foldable display, cause the first application to be displayed on the foldable display, detect a folding of the foldable display after the foldable display has been unfolded, close the first application in response to detecting the closing of the foldable display, generate an updated list of contextual tasks based on one or more actions performed in the first application, and cause the updated list of contextual tasks to be displayed on the first display.

Clause 38. The non-transitory computer-readable media of clause 37, wherein the first user interface and the second user interface are associated with an enterprise productivity application associated with the enterprise productivity support server.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   causing, by a computing device, a first user interface to be presented on a first display, wherein the first user interface comprises:
     a navigation menu; and
     a plurality of contextual tasks including a first task associated with a user, wherein the plurality of contextual tasks are partially obscured by the navigation menu;
   detecting, by the computing device, an opening of a foldable display;
   causing, by the computing device, a second user interface to be presented on the foldable display in response to detecting the opening of the foldable display, wherein the second user interface comprises the plurality of contextual tasks presented adjacent to the navigation menu;
   receiving one or more inputs related to the first task via the second user interface;
   detecting, by the computing device, a closing of the foldable display after the foldable display has been opened;
   generating, by the computing device, an updated list of contextual tasks based on one or more actions performed in the second user interface, based on updated task information received from an enterprise productivity support server, and in response to detecting the closing of the foldable display; and
   causing, by the computing device, an updated first user interface to be displayed on the first display, wherein the updated first user interface comprises the updated list of contextual tasks.

2. The method of claim 1, wherein the first and second user interfaces are associated with an enterprise productivity application associated with an enterprise productivity support server.

3. The method of claim 1, wherein the one or more inputs comprise an approval of the first task.

4. The method of claim 1, further comprising:
   launching a first web application associated with the first task in response to receiving the one or more inputs.

5. The method of claim 4, further comprising:
   launching a second web application associated with the first task, wherein the first web application and the second web application are displayed on both a first portion and a second portion of the foldable display simultaneously.

6. The method of claim 4, wherein the first web application associated with the first task is displayed on both a first portion and a second portion of the foldable display.

7. The method of claim 6, further comprising:
   receiving, from the user, a gesture input, wherein the gesture input is a three-finger fan in; and
   causing, based on the received gesture input, the first web application to be displayed on the first portion of the foldable display.

8. The method of claim 4, wherein the first web application associated is displayed on a first portion of the foldable display.

9. The method of claim 8, further comprising:
   displaying additional information on a second portion of the foldable display, wherein the additional information comprises at least one of the plurality of contextual tasks, a second web application, or a desktop.

10. The method of claim 8, further comprising:
    receiving, from the user, a gesture input; and
    causing, based on the received gesture input, the first web application to be displayed on both a first portion and a second portion of the foldable display.

11. The method of claim 1, further comprising:
    transmitting, to an enterprise productivity support server and in response to detecting the closing of the foldable display, a request for updated tasks for a plurality of web applications hosted on a remote server;
    receiving, from the enterprise productivity support server, a response comprising the updated tasks for the plurality of web applications; and
    displaying the first user interface on a first portion of the foldable display, wherein the first user interface comprises an updated plurality of tasks for the plurality of web applications.

12. The method of claim 1, wherein the plurality of contextual tasks are user-specific and generated by an enterprise productivity support server based on a user's role and input received from other users.

13. The method of claim 1, wherein the plurality of contextual tasks associated with a plurality of web applications are disabled in the first user interface.

14. The method of claim 13, further comprising:
    enabling, by the computing device, the plurality of contextual tasks associated with the plurality of web applications in the second user interface.

15. The method of claim 1, wherein the second user interface comprises one or more animations of the plurality of contextual tasks.

16. A computing device comprising:
    a housing including a display and a foldable display;
    at least one processor in communication with the display and foldable display; and
    memory storing instructions that, when executed by the at least one processor, cause the computing device to:
      cause a first user interface to be presented on the display of the computing device, wherein the first user interface comprises:
        a navigation menu; and
        a plurality of contextual tasks including a first task associated with a user, wherein the plurality of contextual tasks are partially obscured by the navigation menu;
      detect an opening of the foldable display;
      cause a second user interface to be presented on the foldable display in response detecting the opening of the foldable display, wherein the second user interface comprises the plurality of contextual tasks are presented adjacent to the navigation menu;
      receive one or more inputs related to the first task via the second user interface;
      detect a closing of the foldable display after the foldable display has been opened;

generate an updated list of contextual tasks based on one or more actions performed in the second user interface, based on updated task information received from an enterprise productivity support server, and in response to detecting the closing of the foldable display; and cause an updated first user interface to be displayed on the first display, wherein the updated first user interface comprises the updated list of contextual tasks.

17. The computing device of claim 16, wherein the memory stores additional computer-readable instructions that, when executed by the at least one processor, cause the computing device to:

launch a first web application associated with the first task in response to receiving the one or more inputs.

18. The computing device of claim 16, wherein the memory stores additional computer-readable instructions that, when executed by the at least one processor, cause the computing device to:

transmit, to an enterprise productivity support server, a request for updated tasks for a plurality of web applications in response detecting the closing of the foldable display;

receive, from the enterprise productivity support server, a response comprising the updated tasks for the plurality of web applications hosted on a remote server; and displaying the first user interface on a first portion of the foldable display, wherein the first user interface comprises an updated plurality of tasks for the plurality of web applications.

19. One or more non-transitory computer-readable media storing instructions that, when executed by a computer platform comprising at least one processor, memory, and a communication interface, cause the computing platform to:

cause a first user interface to be presented on a first display, wherein the first user interface comprises:
  a navigation menu; and
  a plurality of contextual tasks including a first task associated with a user, wherein the plurality of contextual tasks are partially obscured by the navigation menu;

detect an opening of a foldable display;

cause a second user interface to be displayed on the foldable display in response to detecting the opening of the foldable display, wherein the second interface comprises the plurality of contextual tasks presented adjacent to the navigation menu;

receive one or more inputs related to the first task via the second user interface;

detect a closing of the foldable display after the foldable display has been opened;

generate an updated list of contextual tasks based on one or more actions performed in the second user interface, based on updated task information received from an enterprise productivity support server, and in response to detecting the closing of the foldable display; and cause an updated first user interface to be displayed on the first display, wherein the updated first user interface comprises the updated list of contextual tasks.

20. The one or more non-transitory computer-readable media of claim 19, wherein the first user interface and the second user interface are associated with an enterprise productivity application associated with the enterprise productivity support server.

* * * * *